United States Patent [19]

Shimoda

[11] Patent Number: 5,777,566
[45] Date of Patent: Jul. 7, 1998

[54] ENCODING METHOD FOR PRML SYSTEM, METHOD OF AND APPARATUS FOR DEMODULATING CODE THEREOF, AND PRML SYSTEM

[75] Inventor: Kaneyasu Shimoda, Kawasaki, Japan

[73] Assignee: Fujitsu Limited, Kawasaki, Japan

[21] Appl. No.: 617,238

[22] Filed: Mar. 18, 1996

[30] Foreign Application Priority Data

Mar. 20, 1995 [JP] Japan ................................ 7-060279

[51] Int. Cl.⁶ ............................................ G11B 20/18
[52] U.S. Cl. ............................................ 341/58; 371/43
[58] Field of Search ................. 341/58, 59; 371/43; 375/296

[56] References Cited

U.S. PATENT DOCUMENTS

| | | | |
|---|---|---|---|
| 4,502,036 | 2/1985 | Furukawa | 340/347 |
| 4,609,907 | 9/1986 | Adler et al. | |
| 5,457,705 | 10/1995 | Todoroki | 371/43 |

FOREIGN PATENT DOCUMENTS

| | | |
|---|---|---|
| 4177603 | 6/1992 | Japan. |
| 4221464 | 8/1992 | Japan. |
| 4358364 | 12/1992 | Japan. |
| 5234279 | 9/1993 | Japan. |

*Primary Examiner*—Jeffrey A. Gaffin
*Assistant Examiner*—Peguy Jean Pierre
*Attorney, Agent, or Firm*—Greer, Burns & Crain, Ltd.

[57] ABSTRACT

Disclosed are an encoding method and demodulating method for a PRML system for maximum-likelihood-detecting and demodulating a encoded partial response signal. The encoding method comprises a step of segmenting an input data string into 4-bit data and a step of converting the 4-bit data into 6-bet code words Y={001011, 001101, 001110, 010011, 010110, 011001, 011010, 011100, 100011, 100101, 100110, 101001, 101100, 110001, 110010, 110100}. The demodulating method includes a maximum likelihood detection step by use of a trellis transition, said trellis transition includes path transitions between status A groups {001A, 010A, 100A, 011A, 101A, 110A} constituting last-half 3 bits of the 6-bit code word and status B groups {001B, 010B, 100B, 011B, 101B, 110B} constituting first-half 3 bits of the 6-bit code word and path transitions from the status B groups to the status A groups including path transitions from 011B, 101B, 110B to 001A, 010A, 100A excluding the path transition from 101B to 010A and path transitions from 001B, 010B, 100B to 011A, 101A, 110A excluding the path transition from 010B to 101A.

14 Claims, 18 Drawing Sheets

SYMBOL/EQL SIGNAL

EQUALIZING SIGNAL $y$

PATH DETERMINATION MODE SWITCHING SIGNAL

ENCODING METHOD FOR PRML SYSTEM, METHOD OF AND APPARATUS FOR DEMODULATING CODE THEREOF, AND PRML SYSTEM

BACKGROUND OF THE INVENTION

1. Field of the Invention

The present invention relates to an encoding method for a channel of a partial response in combination with a maximum likelihood detection, a method of and an apparatus for demodulating a code thereof and a PRML (Partial-Response signalling with Maximum Likelihood detection) system.

2. Description of the Related Art

A code-to-code interference has increased due to a higher recording density in a magnetic record. Therefore, signal spectrums concentrate at a low frequency. There has been utilized the PRML (Partial-Response Signalling with Maximum Likelihood detection) wherein the partial-response signalling is combined with a maximum likelihood detecting method as a method of transmitting the signal at this low frequency. This PRML system entails codes by which an encoding gain is to be obtained.

In the PRML system, there have hitherto been proposed the encoding methods aiming at a (1–D) channel and a (1–D²) channel (partial-response class 4). One of them is an 8/9 (0, 4, 4) code as disclosed in the specification of U.S. Pat. No. 4,707,681.

This 8/9 code gives a limit to a [0] continuity for performing clocking and auto-equalization and reducing a path memory of the maximum likelihood detector.

The encoding gain can not be obtained by such an 8/9 code. Under such circumstances, there has been proposed an 8/10 trellis code aiming at the (1–D) channel and the (1–D²) channel (partial-response class 4). This 8/10 trellis code is reported in the following document: "On the Performance of a Rate 8/10 Matched Spectral Null Code For Class-4 Partial Response", written by H. Thapar, et.al., IEEE Trans., on Magnetics, vol.28, no.5, September 1992.

According to this 8/10 trellis encoding method, the limit is given to the 0's continuity. The use of this 8/10 trellis encoding method involves a demodulation of data in combination with the maximum likelihood detection.

This 8/10 trellis code is contrived for the (1–D) or (1–D²) channel. On the other hand, with an enhancement of the recording density, there may be also an application to an extend partial-response class 4 (EPR4) defined as a (1+D–D²–D³) channel. When the above 8/10 trellis code is applied to the EPR4, a minimum code-to-code free distance (Euclid distance) does not increase. For this reason, there arises a problem in which the gain based on the code is not obtained.

For instance, according to the EPR4 method, the minimum code-to-code free distance before the encoding is [4]. Contrastingly, the minimum code-to-code free distance after the 8/10 encoding is [4]. Hence, no encoding gain is obtained.

SUMMARY OF THE INVENTION

It is a primary object of the present invention to provide an encoding method for a PRML system that is capable of obtaining an encoding gain when applied to an EPR4 channel, a method of and an apparatus for demodulating a code thereof and a PRML system thereof.

It is another object of the present invention to provide an encoding method for a PRML system that is capable of an encoding gain in a (1–D) channel, a (1–D²) channel and a (1+D–D²–D³) channel, a method of and an apparatus for demodulating a code thereof and a PRML system thereof.

FIG. 1 is a diagram showing a principle of the present invention.

According to a first aspect of the present invention, there is provided an encoding method for a PRML system for maximum-likelihood-detecting and demodulating a encoded partial response signal. The encoding method comprises a step of segmenting an input data string into 4-bit data and a step of converting the 4-bit data into 6-bit code words Y={001011, 001101, 001110, 010011, 010110, 011001, 011010, 011100, 100011, 100101, 100110, 101001, 101100, 110001, 110010, 110100}.

According to a second aspect of the present invention, there is provided an encoding apparatus for a PRML system for maximum-likelihood-detecting and demodulating a encoded partial response signal. The encoding apparatus comprises means for segmenting an input data string into 4-bit data and means for converting the 4-bit data into 6-bit data and means for converting the 4-bit data into 6-bit code words Y={001011, 001101, 001110, 010011, 010110, 011001, 011010, 011100, 100011, 100101, 100110, 101001, 101100, 110001, 110010, 110100}.

According to a third aspect of the present invention, there is provided a demodulating method of demodulating signals in which 4-bit data are encoded into 6-bit cord words Y={001011, 001101, 001110, 010011, 010110, 011001, 011010, 011100, 100011, 100101, 100110, 101001, 101100, 110001, 110010, 110100}. This demodulating method comprises a step of performing a maximum likelihood detection that by use of a trellis transition, said trellis transition includes path transitions from status A groups {001A, 010A, 100A, 011A, 101A, 110A} constituting last-half 3 bits of the 6-bit code word to status B groups {001B, 010B, 100B, 011B, 101B, 110B} constituting first-half 3 bits of the 6-bit code word and path transitions from the status B groups to the status A groups including path transitions from 011B, 101B, 110B to 001A, 010A, 100A excluding the path transition from 101B to 010A and path transitions from 001B, 010B, 100B to 011A, 101A, 110A excluding the path transition from 010B to 101A; and a step of decoding the maximum-likelihood-detected 6-bit data into 4-bit data.

According to a fourth aspect of the present invention, there is provided a demodulating apparatus for demodulating signals in which 4-bit data are encoded into 6-bit cord words Y={001011, 001101, 001110, 010011, 010110, 011001, 011010, 011100, 100011, 100101, 100110, 101001, 101100, 110001, 110010, 110100}. The demodulating apparatus comprises a maximum likelihood detector for performing a maximum likelihood detection by use of a trellis transition, said trellis transition includes path transitions between status A groups {001A, 010A, 100A, 011A, 101A, 110A} constituting last-half 3 bits of the 6-bit code word to status B groups {001B, 010B, 100B, 011B, 101B, 110B} constituting first-half 3 bits of the 6-bit code word and path transitions from the status B groups to the status A groups including path transitions from 011B, 101B, 110B to 001A, 010A, 100A excluding the path transition from 101B to 010A and path transitions from 001B, 010B, 100B to 011A, 101A, 110A excluding the path transition from 010B to 101A and a decoder for decoding the maximum-likelihood-detected 6-bit data into 4-bit data.

According to a fifth aspect of the present invention, there is provided a PRML system comprising an encoder for encoding 4-bit data into 6-bit cord words Y={001011, 001101, 001110, 010011, 010110, 011001, 011010, 011100, 100011, 100101, 100110, 101001, 101100, 110001, 110010, 110100}. The PRML system further comprises a channel through which the encoded signals pass, a maximum likelihood detector for performing a maximum likelihood detection by use of a trellis transition, said trellis transition includes path transitions from status A groups {001A, 010A, 100A, 011A, 101A, 110A} constituting last-half 3 bits of the 6-bit code word from said channel to status B groups {001B, 010B, 100B, 011B, 101B, 110B} constituting first-half 3 bits of the 6-bit code word and path transitions from the status B groups to the status A groups including path transitions from 001B, 101B, 110B to 001A, 010A, 100A excluding the path transition from 101B to 010A and path transitions from 001B, 010B, 100B to 011A, 101A, 110A excluding the path transition from 010B to 101A. The PRML system also comprises a decoder for decoding the maximum-likelihood-detected 6-bit data into 4-bit data.

The conventional 8/10 trellis code is equal to a 4/5 code. In this code, as explained above, the minimum code-to-code free distance can not be acquired. Therefore, it is adopted the code in which a redundancy increases.

That is, the arrangement is such that the gain is to be obtained with a change to a 4/6 code. This 6-bit code is divided into first-half 3 bits and last-half 3 bits. In the EPR4 channel, [000] and [111] among the 3-bit codes obtain no clock for a long period and hence eliminated.

On the other hand, 3-bit data is divided into α groups (001, 010, 100) having one bit of [1] and β groups (011, 101, 110) having 2 bits of [1]. Forming a 6-bit code word may involve combinations of α+β with β+α and α+α with β+β.

A Hamming distance is checked in those combinations. The combination of α+β with β+α provides a Hamming distance of [2], while the combination of α+α with β+β provide a Hamming distance of [1]. The Hamming distance is proportional to the minimum code-to-code free distance, and it can be therefore understood that the gain is obtained in the combination of α+β with β+α.

Eighteen kinds of code words can be thereby acquired. Further, [010101] and [101010] among those 6-bit code words are also eliminated because of signals being all [0] in the EPR4 channel. Accordingly, remaining 16 kinds of code words are made corresponding to the 4-bit data.

More specifically, the encoding gain is obtained in the (1−D) channel and the EPR4 channel by encoding the 4-bit data into the 6-bit code words Y={001011, 001101, 001110, 010011, 010110, 011001, 011010, 011100, 100011, 100101, 100110, 101001, 101100, 110001, 110010, 110100}.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
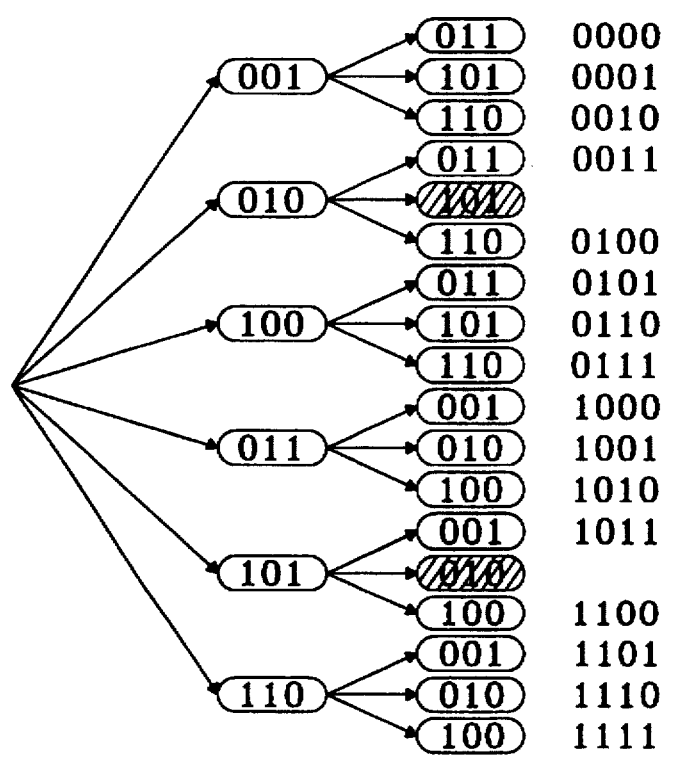
FIG. 1 is a diagram showing a principle of the present invention.
Figure 2:
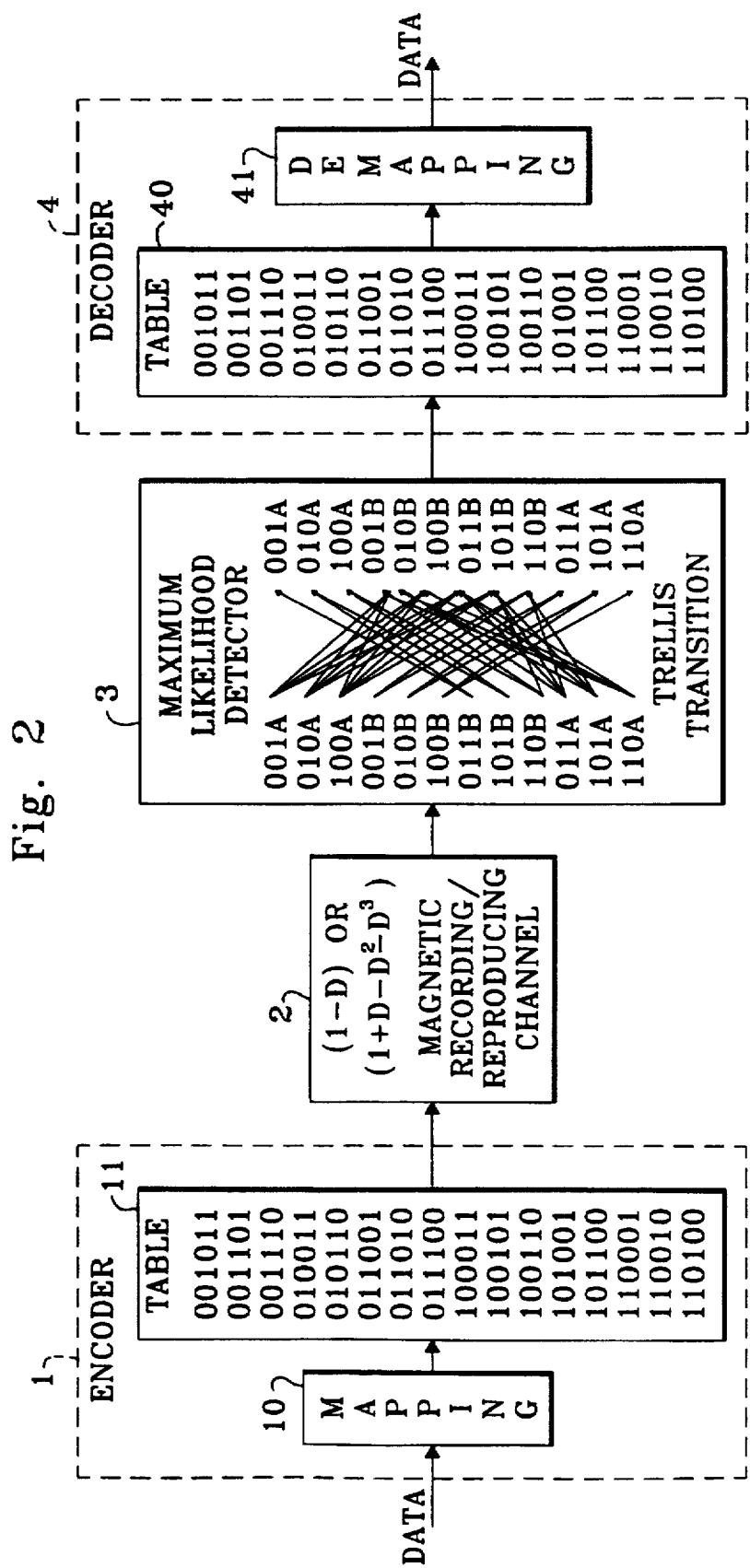
FIG. 2 is a diagram illustrating a construction of one embodiment of the present invention.
Figure 3:
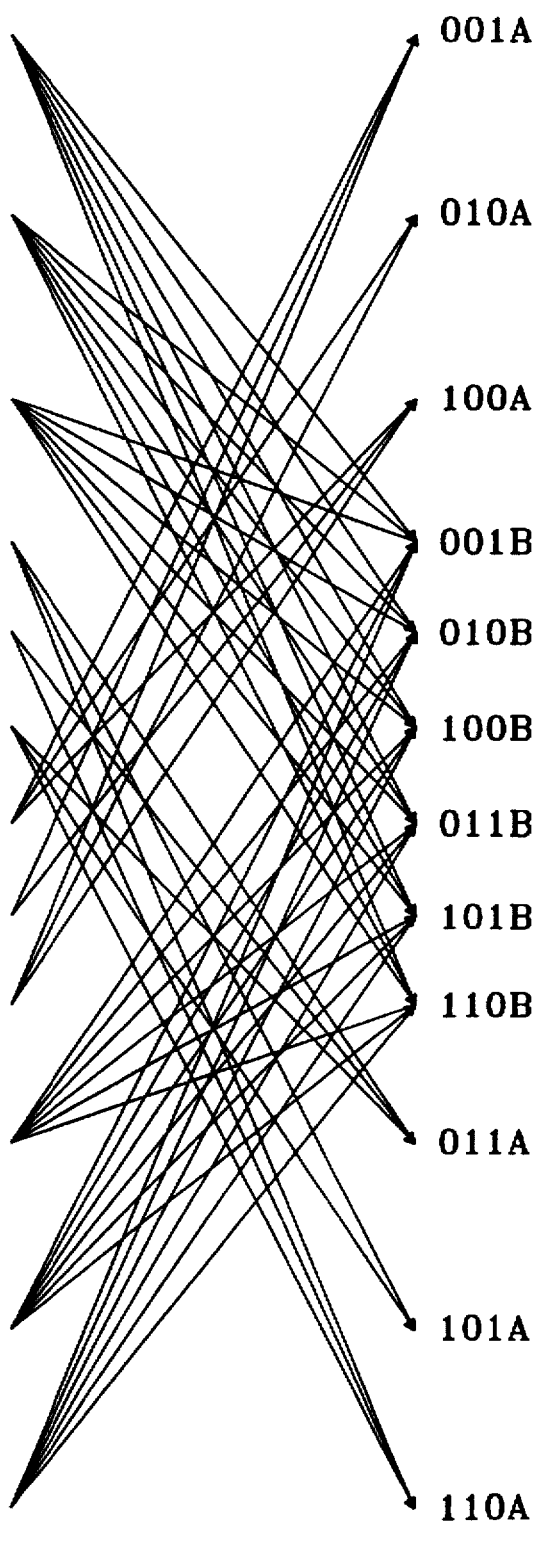
FIG. 3 is a trellis diagram, showing a (1−D) channel, of assistance in explaining FIG. 2.
Figure 4:
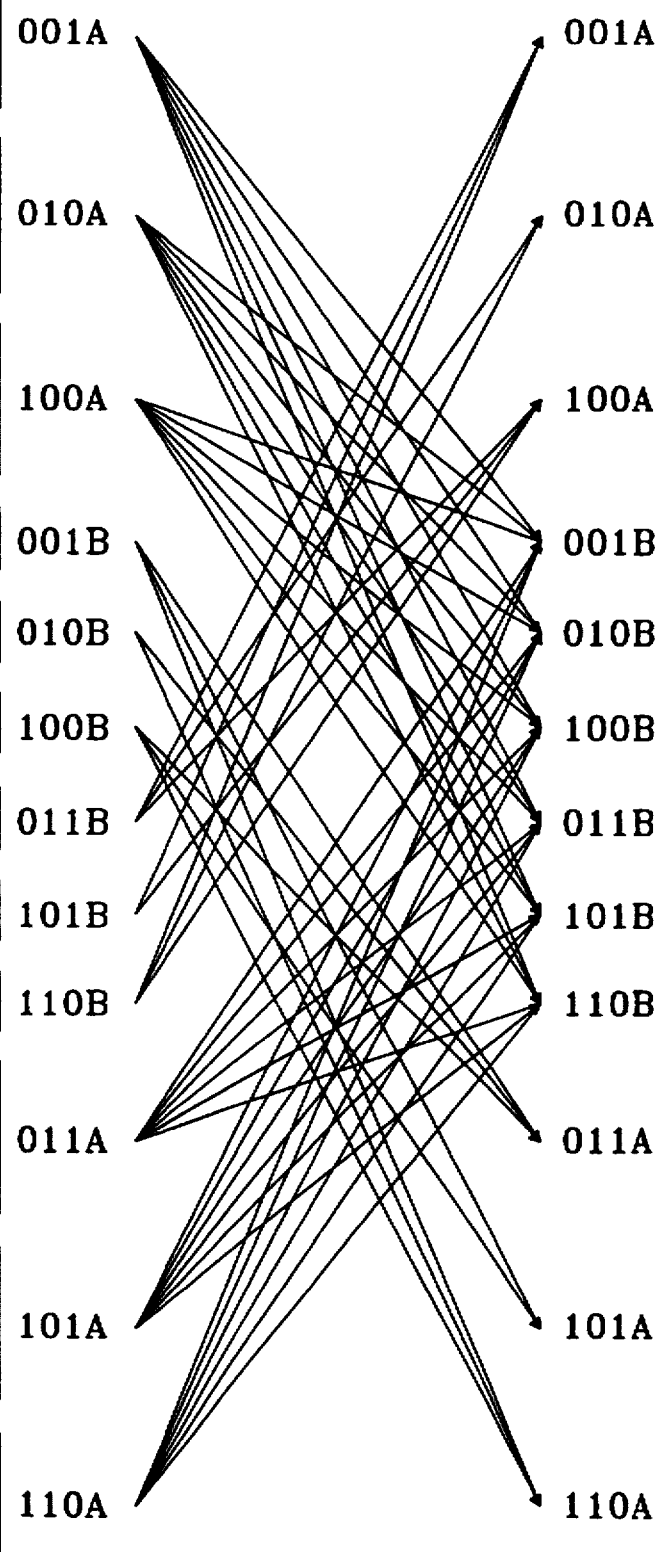
FIG. 4 is a trellis diagram, showing a $(1+D-D^2-D^3)$ channel, of assistance in explaining FIG. 2.

FIG. 2 is a diagram showing a construction of one embodiment of the present invention. FIG. 3 is a trellis diagram in a (1−D) channel. FIG. 4 is a trellis diagram in a $(1+D-D^2-D^3)$ channel.

FIG. 2 illustrates a magnetic recording/reproducing system. As shown in FIG. 2, an encoder 1 encodes data into 6-bit code words by segmenting a data string 4-bitwise. The encoder 1 includes a mapping circuit 10 performing 4-bitwise segmentation of the data string and making reference to a table 11. The encoder 1 also includes the table 11 stored with the 6-bit code word corresponding to each piece of 4-bit data.

Accordingly, the encoder 1 segments the data string 4-bitwise and thus converts the data into the 6-bit code words with reference to the table 11.

This item of encoded data are inputted to a magnetic recording/reproducing channel 2. The magnetic recording/reproducing channel 2 has a (1−D) or $(1+D-D^2-D^3)$ characteristic. This magnetic recording/reproducing channel 2 includes a magnetic disk, a magnetic head and an equalizing circuit.

Signals regenerated from the magnetic recording/reproducing channel 2 are inputted to a maximum likelihood detector 3. The maximum likelihood detector 3 detects a maximum likelihood data string by making use of a trellis transition. This maximum likelihood detector 3 will hereinafter be described in greater detail.

The 6-bit data detected by the maximum likelihood detector 3 are inputted to a decoder 4. The decoder 4 decodes the 6-bit data (code word) into the 4-bit data. This decoder 4 includes a table 40 stored with the 4-bit data corresponding to each 6-bit code word and a demapping circuit 41 for converting the 6-bit data into the 4-bit data.

FIG. 3 is a trellis diagram in the (1–D) channel based on the code according to the present invention. The 6-bit code word is composed of a cord word generated by combining a 3-bit symbol string set {001, 010, 100} (α group) and a 3-bit symbol string set {011, 101, 110} (β group) back and forth.

This code word serves to encode the 4-bit data into the 6-bit data. This code word increases in terms of a redundancy as compared with an 8/10 trellis code, thereby obtaining a gain.

Among the 6-bit data, 3-bit codes [000] and [111] are eliminated because of obtaining no clock for a long period in an EPR4 channel. Hence, a target symbol string is constructed of a one-bit-of-[1] α group (001, 010, 100) and a two-bit-of-[1] β group (011, 101, 110). Configuring the 6-bit code word from this symbol string may involve combinations such as α+β with β+α and α+α with β+β.

A Hamming distance will be checked in those combinations. The Hamming distance is [2] in the combination of α+β with β+α. While in the combination of α+α with β+β, the Hamming distance is [1]. That is, a bitwise variation between the α group and the β group is [1]. Accordingly, in the combination α+α with β+β, the Hamming distance [1].

This Hamming distance is proportional to a minimum code-to-code free distance, and it can be understood that the gain is obtained in the combination of α+β with β+α. The combination of α+α with β+β is therefore eliminated.

Eighteen kinds of word words are thereby obtained. Further, among these eighteen kinds of code words, [010101] and [101010] are eliminated because of the signals being all [0] in the EPR4 channel. Accordingly, the remaining sixteen kinds of code words are made corresponding to the 4-bit data.

More specifically, the 4-bit data are allocated to the 6-bit code words Y={001011, 001101, 001110, 010011, 010110, 011001, 011010, 011100, 100011, 100101, 100110, 101001, 101100, 110001, 110010, 110100}.

As illustrated in FIG. 3, there are 12 statuses, i.e., six status A groups {001A, 010A, 100A, 011A, 101A, 110A} and six status B groups {001B, 010B, 100B, 011B, 101B, 110B}. There are transitions to 12 statuses from those 12 statuses.

At code links, there are path-transitions from all the status A groups to all the status B groups. Herein, [A] in the status A is a suffix indicating the code link.

On the other hand, in the 6-bit codes, there are the path-transitions from the status B groups to the status A groups. Herein, [B] in the status B is a suffix indicating an intra-code status. Therein, as explained above, within the codes, the combination of α+α with β+β having a small Hamming distance is eliminated. That is, the α groups {001B, 010B, 100B} path-transit to the β groups {011A, 101A, 110A}. Further, the β groups {011B, 101B, 110B} path-transit to the α groups {001A, 010A, 100A}.

Moreover, as explained above, in the EPR4 channel, there are eliminated [010101] and [101010] wherein the signals are all [0]. Eliminated therefore are the transitions from [010B] to [101A] and from [101B] to [010A].

Further, referring again to FIG. 3, the symbol string corresponding to the path transition and an equalization signal string at that time are indicated by [symbol string/equalization signal string] and shown in sequence from the upper path. For example, when transitioning from [001A] to [001B], as shown in the uppermost position in FIG. 3, the equalization signal string (expected values) goes such as −1, 0, +1.

Calculated is the minimum code-to-code free distance in the (1–D) channel based on this encoding. One combination of the status transition in this case may be 001A-001B-011A and 001A-100B-011A. What is herein shown is one example, and there are such other combinations of the status transition as to attain the minimum code-to-code free distance.

The equalization signal string in the path-transition from [001A] to [001B] is (−1, 0, +1), while the equalization signal string in the path-transition from [001B] to [001A] is (−1, +1, 0), and hence the former equalization signal string becomes as follows:

$$-1, 0, +1, -1, +1, 0$$

Similarly, the equalization signal string in the path-transition from [001A] to [100B] is (0, −1, 0), while the equalization signal string in the path-transition from 100B to [011A] is (0, +1, 0), and therefore the equalization signal string in the latter status transition becomes as follows:

$$0, -1, 0, 0, +1, 0$$

Accordingly, the minimum code-to-code free distance d is given by:

$$\begin{aligned} d &= (-1-0)^2 + (0+1)^2 + (+1-0)^2 + (-1-0)^2 \\ &\quad + (1-1)^2 + (0-0)^2 \\ &= 4 \end{aligned}$$

Since the minimum code-to-code free distance before encoding is [2], an encoding gain G is given by as follows:

$$\begin{aligned} G &= 10 \log_{10}(4/2) dB \\ &= 3 dB \end{aligned}$$

Hence, the encoding gain is obtained in the (1–D) channel owing to the codes according to the present invention.

FIG. 4 is a trellis diagram (status transition diagram) in a $(1+D-D^2-D^3)$ channel (extended partial response class 4) based on the codes according to the present invention.

As illustrated in FIG. 4, in the $(1+D-D^2+D^3)$ channel also, there are the 12 statuses, i.e., the six status A groups {001A, 010A, 100A, 011A, 101A, 110A} and the six status B groups {001B, 010B, 100B, 011B, 101B, 110B}. At the code links, there are the path-transitions from all the status A groups to all the status B groups.

On the other hand, in the 6-bit codes, there are the path-transitions from the status B groups to the status A groups. Therein, as described above, within the codes, the combination of α+α with β+β having the small Hamming distance is eliminated. That is, the α groups {001B, 010B, 100B} path-transit to the β groups {011A, 101A, 110A}. Further, the β groups {011B, 101B, 110B} path-transit to the α groups {001A, 010A, 100A}.

Furthermore, as discussed above, in the EPR4 channel, there are eliminated [010101] and [101010] wherein the signals are all [0]. Eliminated therefore are the transitions from [010B] to [101A] and from [101B] to [010A].

Further, referring again to FIG. 4, the symbol string corresponding to the path transition and the equalization signal string at that time are indicated by [symbol string/ equalization signal string] and shown in sequence from the upper path. For example, when transitioning from [001A] to [100B], the equalization signal string (expected values) goes such as +2, 0, −2.

Calculated is the minimum code-to-code free distance in the (1+D−D²−D³) channel based on this encoding. One combination of the status transition in this instance may be 001A-001B-011A and 001A-010B-011A. What is herein shown is one example, and there are such other combinations of the status transition as to attain the minimum code-to-code free distance.

In FIG. 4, the equalization signal string in the path-transition from [001A] to [001B] is (+1, −1, 0), while the equalization signal string in the path-transition from [001B] to [011A] is (+1, 0, +1), and hence the equalization signal string in the former status transition becomes as follows:

+1,−1,0,+1,0,+1

Similarly, the equalization signal string in the path-transition from [001A] to [010B] is (+1, 0, 0), while the equalization signal string in the path-transition from [010B] to [011A] is (−1, 0, +2), and therefore the equalization signal string in the latter status transition becomes as follows:

+1,0,0,−1,0,+2

Accordingly, the minimum code-to-code free distance d is given by:

$$\begin{aligned} d &= (-1-1)^2 + (-1-0)^2 + (0-0)^2 + (-1+1)^2 \\ &\quad + (0-0)^2 + (+1-2)^2 \\ &= 6 \end{aligned}$$

Since the minimum code-to-code free distance before encoding is [4], the encoding gain G is given by as follows:

$$\begin{aligned} G &= 10 \text{Log}_{10}(6/4) dB \\ &= 1.8 dB \end{aligned}$$

Hence, the encoding gain is obtained in the (1+D−D²−D³) channel owing to the codes according to the present invention.

Figure 5:
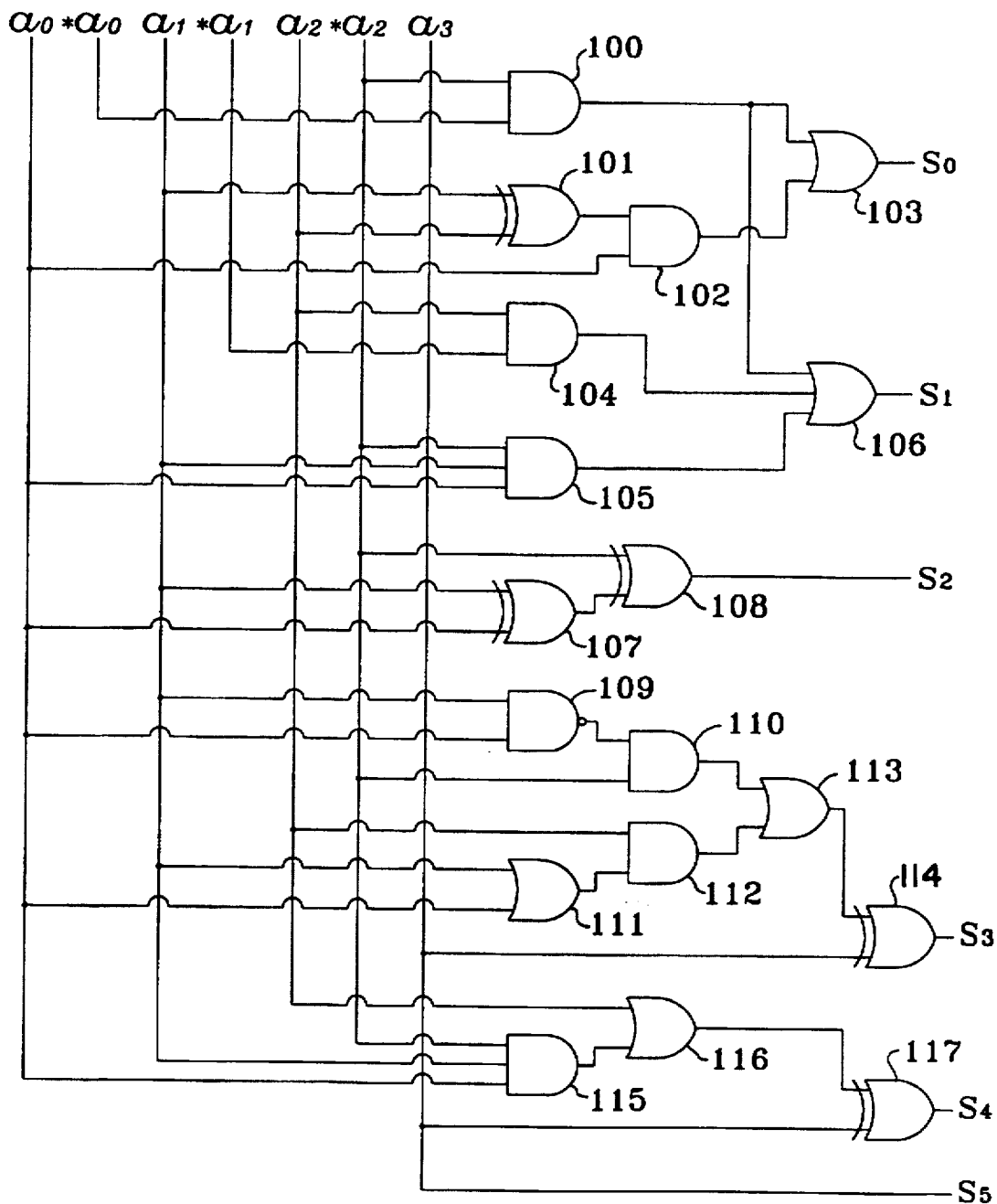
FIG. 5 is a diagram of a configuration of an encoder, illustrating another embodiment of the present invention.

FIG. 5 illustrates an example where the encoder in FIG. 2 is constructed of logic circuits. Referring to FIG. 5, let $a_0$–$a_3$ be 4-bit data bits and $S_0$–$S_5$ be 6-bit code words. Note that *$a_0$, *$a_1$, *$a_2$ are inversion signals of the respective data bits $a_0$, $a_1$, $a_2$.

As shown in FIG. 5, an AND gate 100 outputs an AND of the data bit *$a_0$ and the data bit *$a_2$. An exclusive OR circuit 101 outputs an exclusive OR of the data bit $a_1$ and the data bit $a_2$. An AND gate 102 outputs an AND of the data bit $a_0$ and an output of the exclusive OR circuit 101. An OR gate 103 outputs an OR of an output of the AND gate 100 and an output of the AND gate 102. An output of this OR gate 103 becomes a code bit $S_0$.

An AND gate 104 outputs an AND of the data bit $a_2$ and the data bit $a_1$. An AND gate 105 outputs an AND of the data bit *$a_0$, the data bit $a_1$ and the data bit *$a_2$. An OR gate outputs an OR of outputs of the three AND gates 100, 104 and 105. An output of this OR gate 106 turns out to be a code bit $S_1$.

An exclusive OR circuit 107 outputs an exclusive OR of the data bit $a_0$ and the data bit $a_1$. An exclusive OR circuit 108 outputs an exclusive OR of the data bit *$a_2$ and an output of the exclusive OR circuit 107. An output of this exclusive OR circuit 108 becomes a code bit $S_2$.

A NAND gate 109 outputs an inversion signal of an AND of the data bit $a_0$ and the data bit $a_1$. An AND gate 110 outputs an AND of the data bit *$a_2$ and an output of the NAND gate 109. An OR gate 111 outputs an OR of the data bit $a_0$ and the data bit $a_1$. An AND gate 112 outputs an AND of the data bit $a_2$ and an output of the OR gate 111. An OR gate 113 output an OR of outputs of the two AND gates 110, 112. An exclusive OR circuit 114 outputs an exclusive OR of the data bit $a_3$ and an output of the OR gate 113. An output of this exclusive OR circuit 114 is a code bit $S_3$.

An AND gate 115 outputs an AND of three pieces of data bits $a_0$, $a_1$, *$a_2$. An OR gate 116 outputs an OR of the data bit $a_2$ and an output of the AND gate 115. An exclusive OR circuit 117 outputs an exclusive OR of the data bit $a_3$ and an output of the OR gate 116. An output of this exclusive OR circuit 117 is a code bit $S_4$.

A code bit $S_5$ is a data bit $a_3$.

This is expressed by the following logical formula:

$$S_0 = a_2 \cdot {}^*a_0 + (a_2 [0] a_1) \cdot a_0$$

$$S_1 = {}^*a_2 \cdot {}^*a_0 + a_2 \cdot {}^*a_1 + {}^*a_2 \cdot a_1 \cdot a_0$$

$$S_2 = a_2 [0] a_1 [0] a_0$$

$$S_3 = a_3 [0] \{ {}^*a_2 \cdot {}^*(a_1 \cdot a_0) + a_2 (a_1 + a_0) \}$$

$$S_4 = a_3 [0] (a_2 + {}^*a_2 \cdot a_1 \cdot a_0)$$

$$S_5 = a_3$$

Note that [·] designates an AND, [+] represents an OR, and [0] indicates an exclusive OR.

Figure 6:
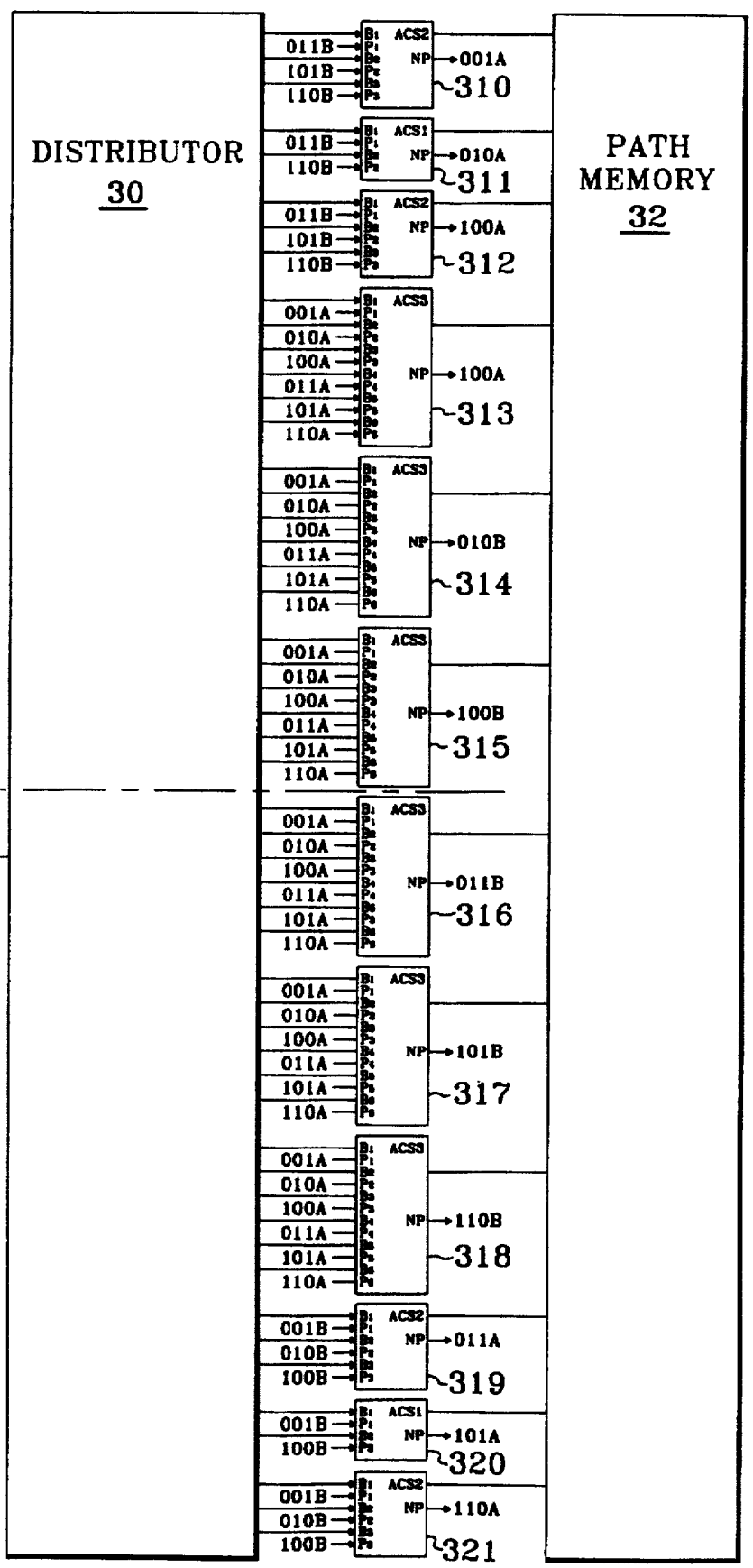
FIG. 6 is a block diagram showing one embodiment of a maximum likelihood detector in the construction of FIG. 2.
Figure 7:
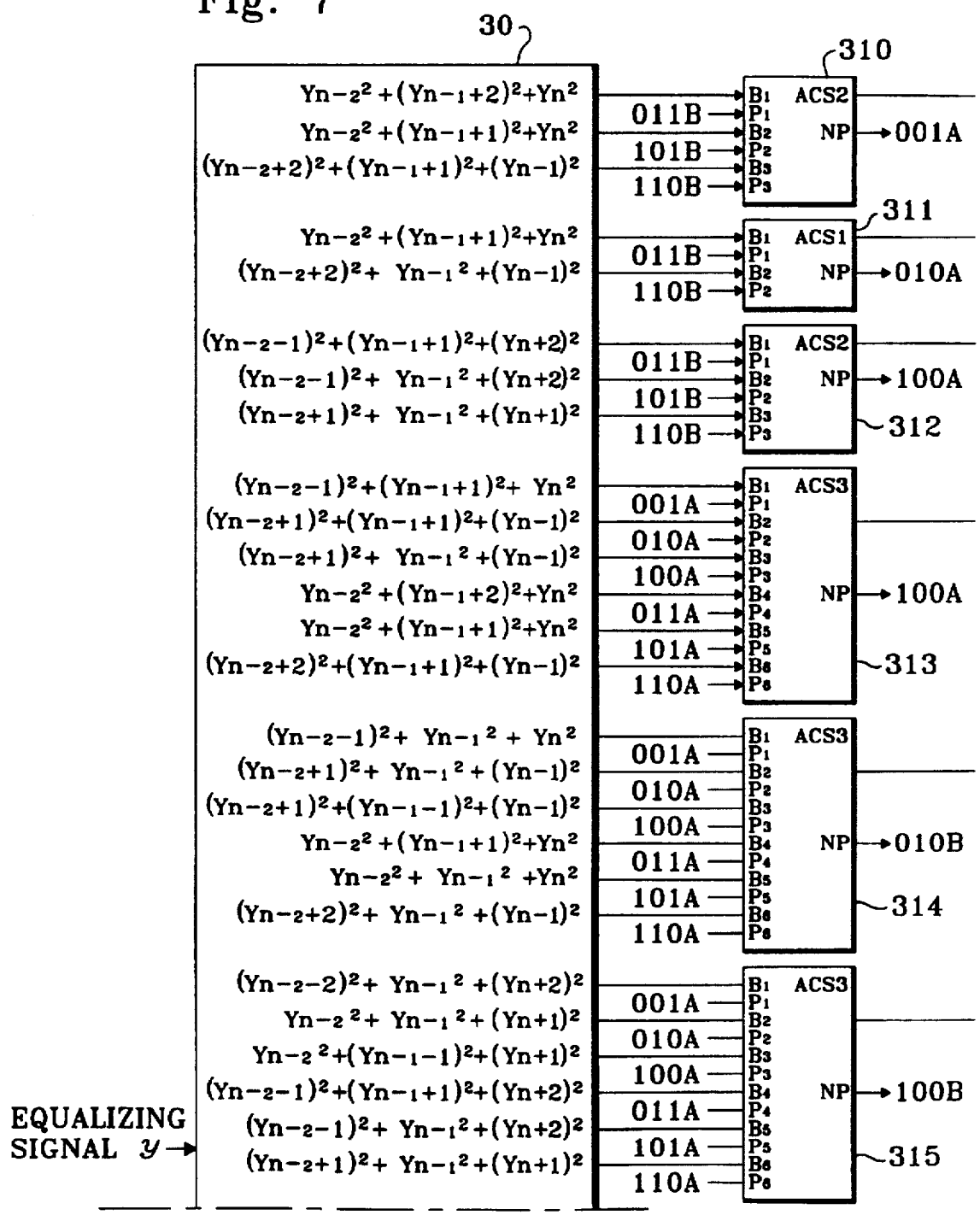
FIG. 7 is a block diagram showing details of an upper half of the construction of FIG. 6.
Figure 8:
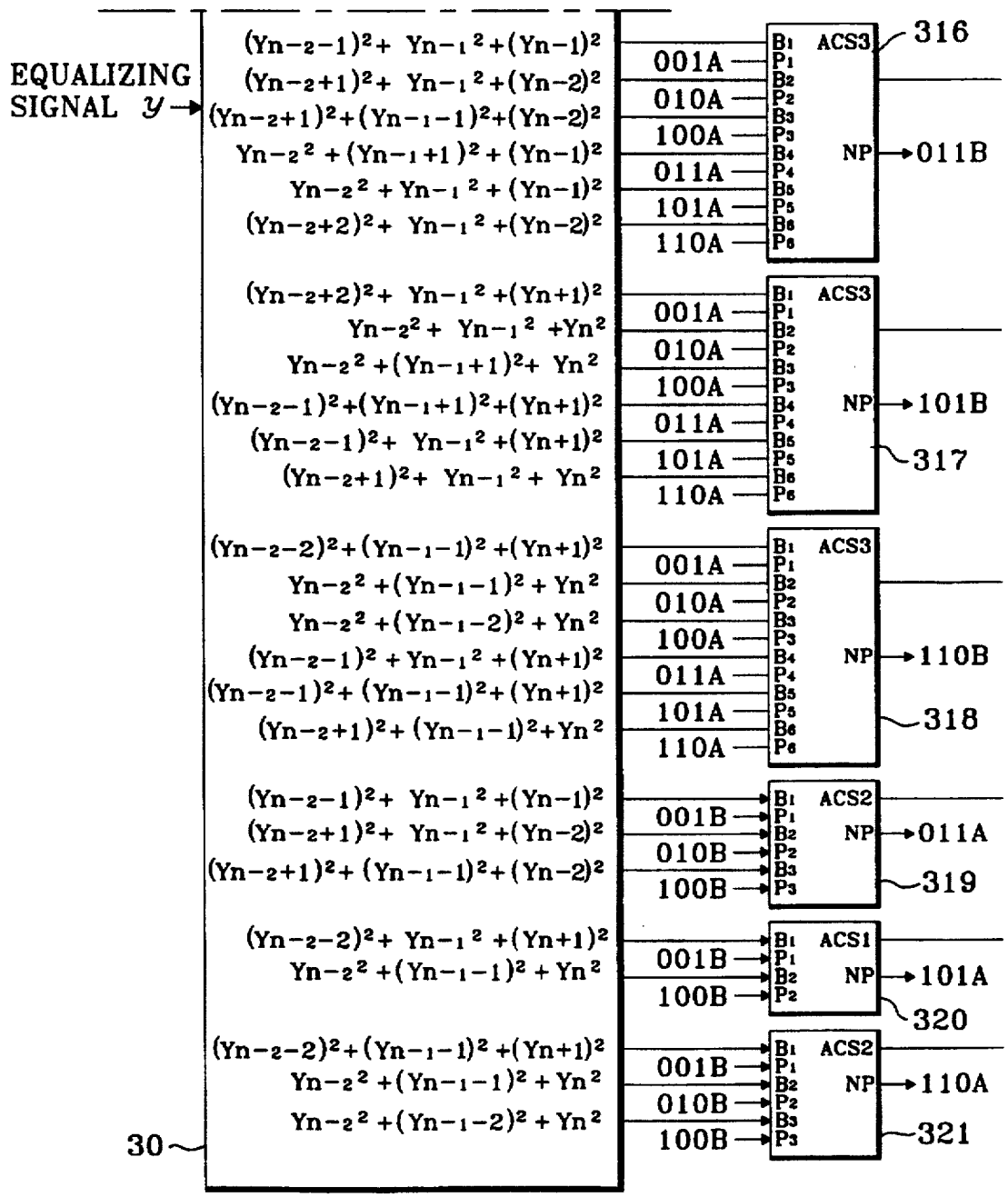
FIG. 8 is a block diagram showing details of a lower half of the construction of FIG. 6.
Figure 9:
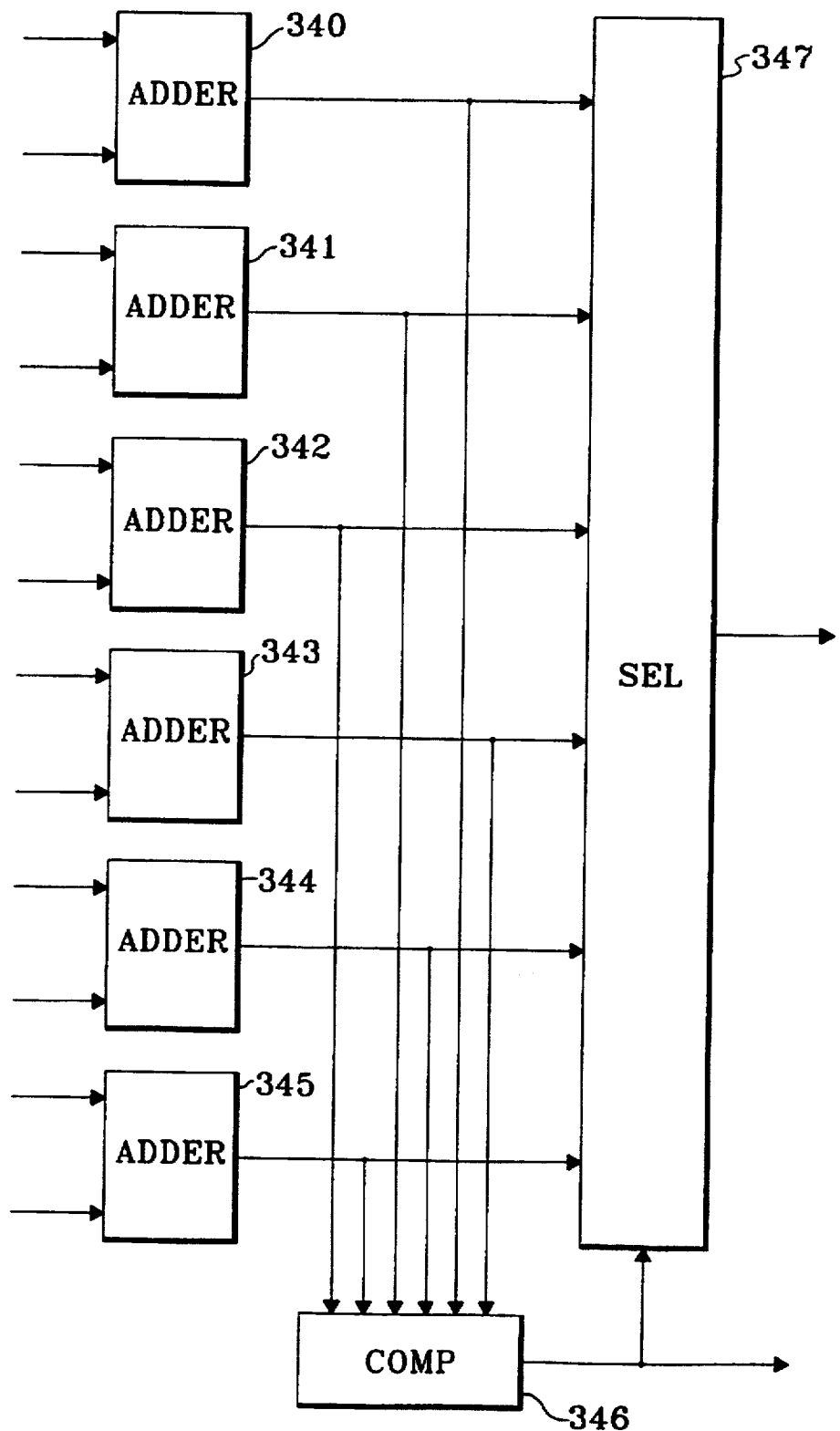
FIG. 9 is a block diagram of an ACS circuit in the constructions of FIGS. 7 and 8.

FIG. 6 is a diagram showing one example of a configuration of the maximum likelihood detector in the (1+D−D²−D³) channel in the construction of FIG. 2. FIGS. 7 and 8 are detailed circuit diagrams thereof. FIG. 9 is a block diagram of an ACS circuit thereof. Note that FIG. 7 illustrates details of an upper half portion of FIG. 6. FIG. 8 shows details of a lower half portion of FIG. 6.

As illustrated in FIG. 6, the maximum likelihood detector 3 includes a distributor 30, ACS (Adder/Comparator/Selector) 310–321 and a path memory 32. The distributor 30 calculates Euclid distances of respective branches from equalization signals y and distributes them to the ACS circuits 310–321 corresponding thereto. This distributor 30 is constructed of a known square circuit and a known adder.

The ACS circuits 310–321 provided number 12 corresponding to the above 12 statuses. Each of the ACS circuits 310–321 adds a branch metric value from a candidate status to each status and also a path metric value of a candidate status of a previous stage, thus calculating a path metric candidate value. Then, a path of a minimum candidate value is selected by comparing those candidate values.

For example, the ACS circuit 310 selects a transition to [001A]. Candidates of the transition to [001A] are, as shown above in FIG. 4, transitions from [011B], [101B], [110B]. Therefore, as shown in FIG. 7, the ACS circuit 310 adds a branch metric value $Y_{n-2}^2 + (Y_{n-1}+2)^2 + Y_n^2$ and a path metric value (herein indicated by 001B) from [011B] of the previous stage, thus calculating a path metric candidate value of [001A].

Similarly, the ACS circuit 310 adds a branch metric value $Y_{n-2}^2 + (Y_{n-1}+1)^2 + Y_n^2$ and a path metric value (herein indicated by 101B) from [101B] of the previous stage, thus calculating the path metric candidate value of [001A].

Similarly, the ACS circuit 310 adds a branch metric value $(Y_{n-2}+2)^2 + (Y_{n-1}+1)^2 + (Y_n-1)^2$ and a path metric value (herein indicated by 110B) from [110B] of the previous stage, thus calculating the path metric candidate value of [001A].

Then, the ACS circuit 310 compares the added path metric candidates values are compared, thereby selecting the path of the minimum candidate value.

Hereinafter, similarly, the ACS circuit 311 selects transitions from [011B], [110B] to [010A]. The ACS circuit 312 selects transitions from [011B], [101B], [110B] to [100A]. The ACS circuit 313 selects transitions from [001A], [010A], [100A], [011A], [101A], [110A] to [001B]. The ACS circuit 314 selects transitions from [001A], [010A], [100A], [011A], [101A], [110A] to [010B]. The ACS circuit 315 selects transitions from [001A], [010A], [100A], [011A], [101A], [110A] to [100B].

Referring next to FIG. 8, the ACS circuit 316 selects transitions from [001A], [010A], [100A], [011A], [101A], [110A] to [011B]. The ACS circuit 317 selects transitions from [001A], [010A], [100A], [011A], [101A], [110A] to [101B]. The ACS circuit 318 selects transitions from [001A], [010A], [100A], [011A], [101A], [110A] to [110B].

The ACS circuit 319 selects transitions from [011B], [101B], [110B] to [011A]. The ACS circuit 320 selects transitions from [011B], [110B] to [101A]. The ACS circuit 321 selects transitions from [011B], [101B], [110B] to [110A].

Those ACS circuits are, as illustrated in FIG. 9, constructed of adders, comparators and selectors. For instance, FIG. 9 shows configurations of the ACS circuits 313, 314, 315, 316, 317, 318. This ACS circuit includes six adders 340–345 for calculating the path metric candidate values, a comparator 346 for comparing outputs of the six adders 340–345 and a selector 347 for selecting outputs of the six adders 340–345 on the basis of an output of the comparator 346.

An output of the selector 347 serves as a next path metric value, while the output of the comparator 346 is a path selected. A path memory 32 illustrated in FIG. 6 holds the selected path.

Thus, the maximum likelihood detector 3 has 12 statues of the status A groups and the status B groups. There are the path transitions from all the statuses of the status A groups to all the statuses of the status B groups.

Further, when path-transitioning from the status B group to the status A group, there are transitions from 001B, 101B, 110B to 001A, 010A, 100A (the transition from 101B to 010A is, however, excluded) and from 001B, 010B, 100B to 011A, 101A, 110A (the transition from 010B to 101A is excluded).

Figure 10:
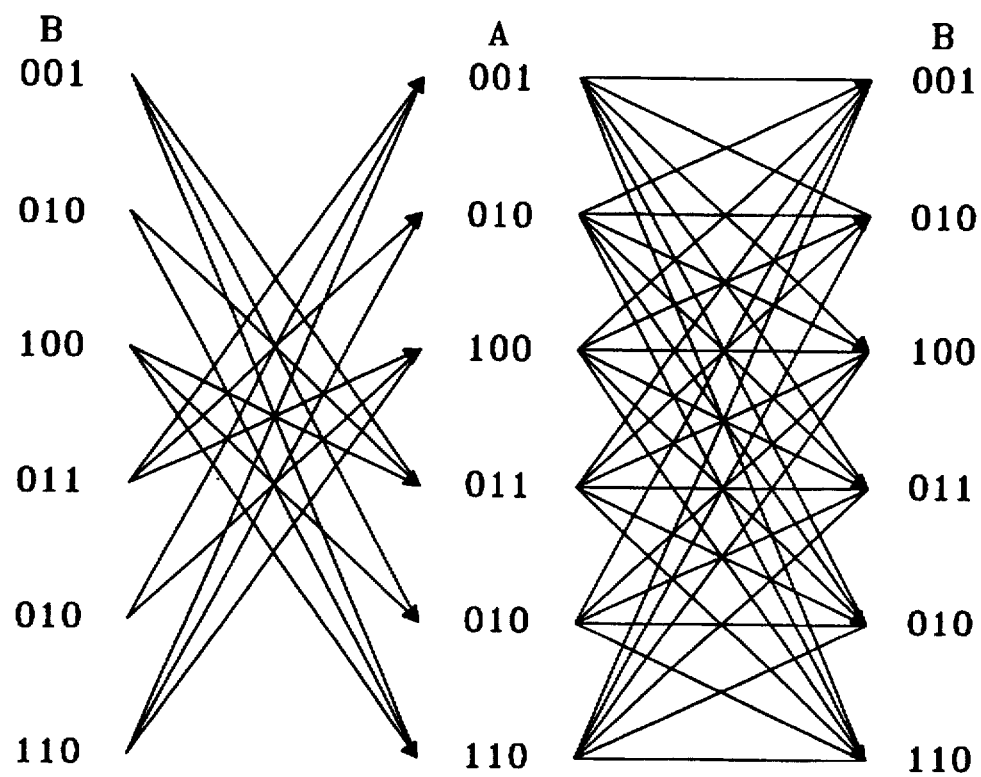
FIG. 10 is a trellis diagram showing a time-division process in still another embodiment of the present invention.
Figure 11:
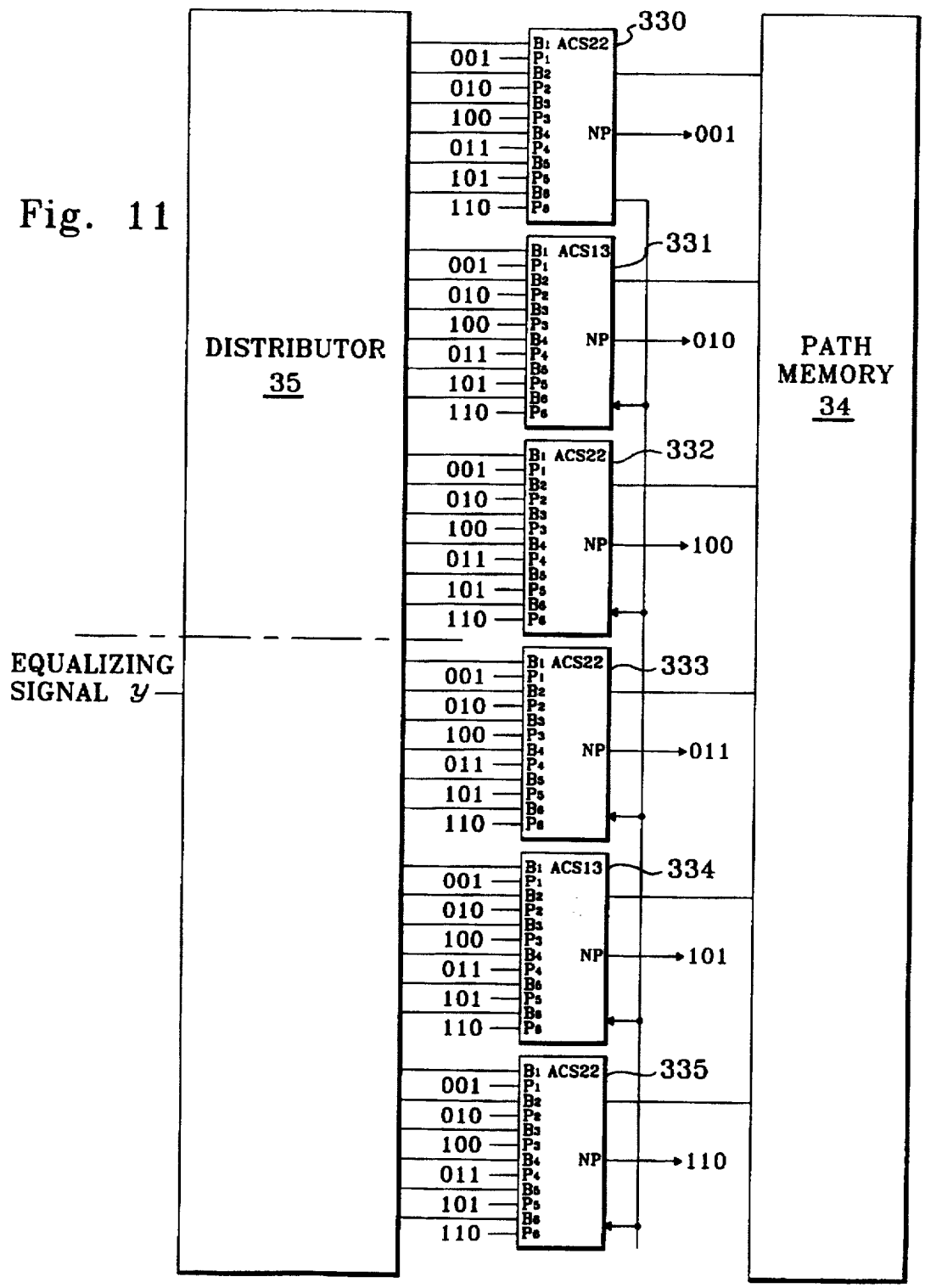
FIG. 11 is a block diagram illustrating a modified embodiment of the maximum likelihood detector of the present invention.
Figure 12:
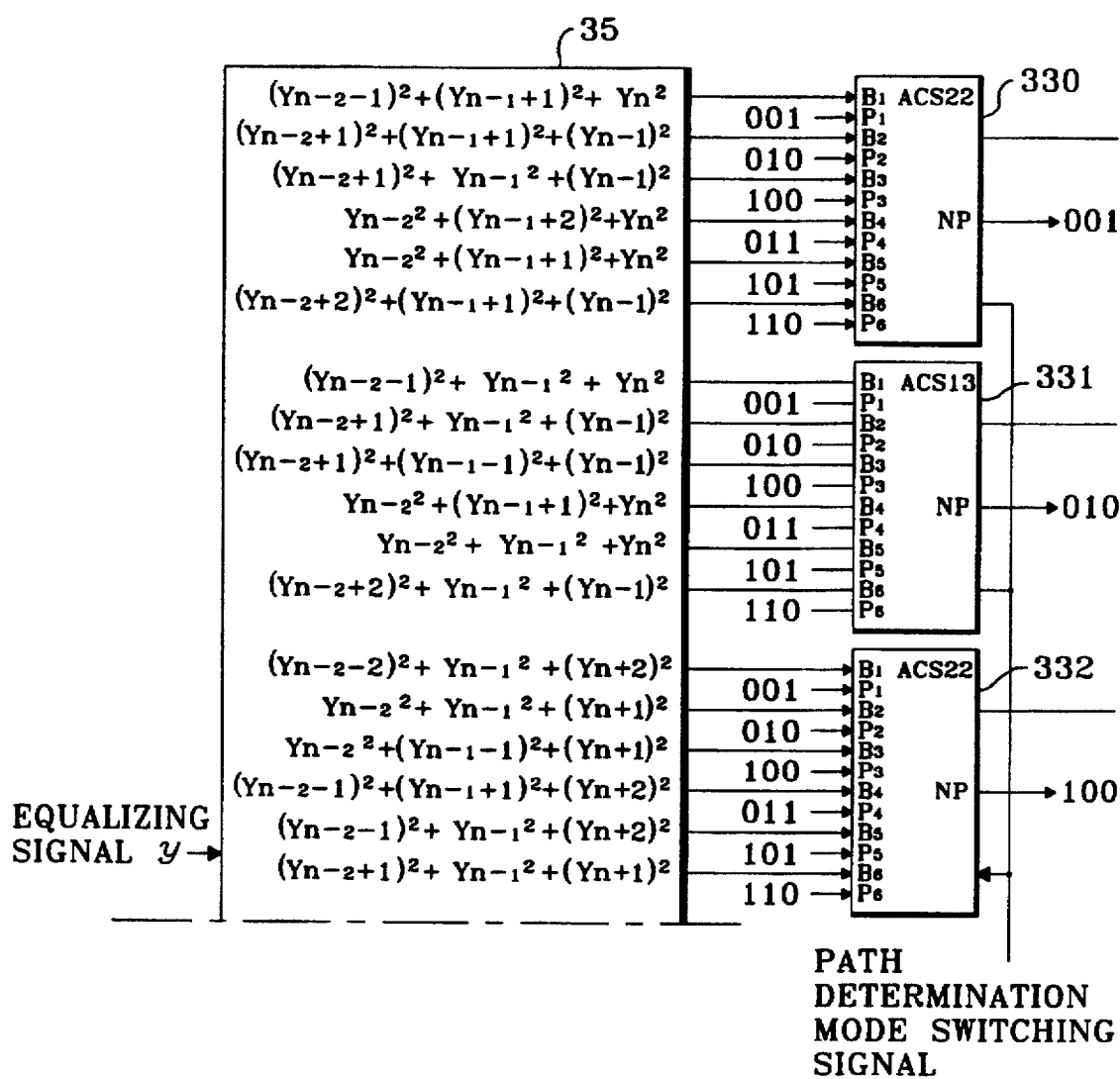
FIG. 12 is a block diagram showing details of the upper half of the construction of FIG. 11.
Figure 13:
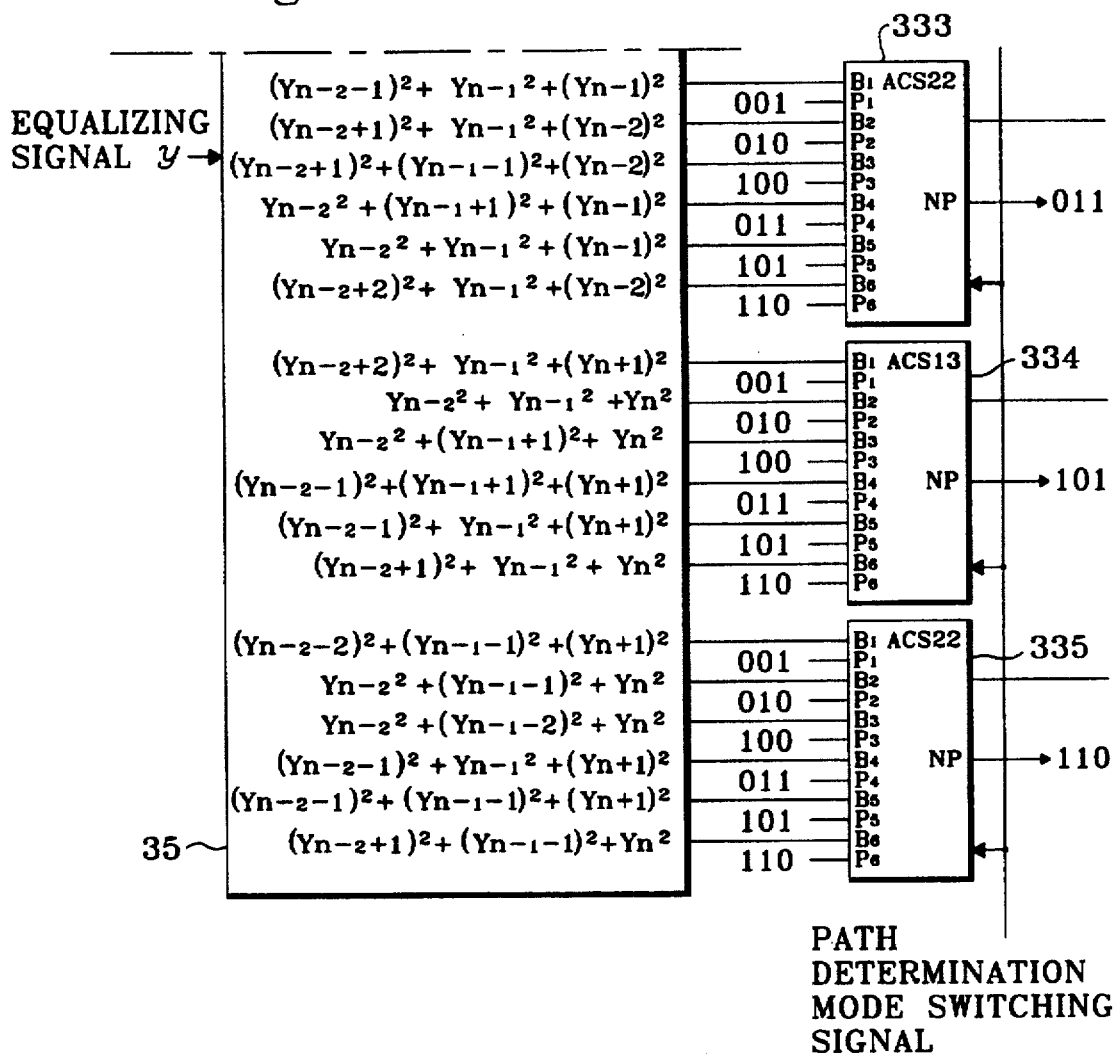
FIG. 13 is a block diagram showing details of the lower half of the construction of FIG. 11.
Figure 14A:
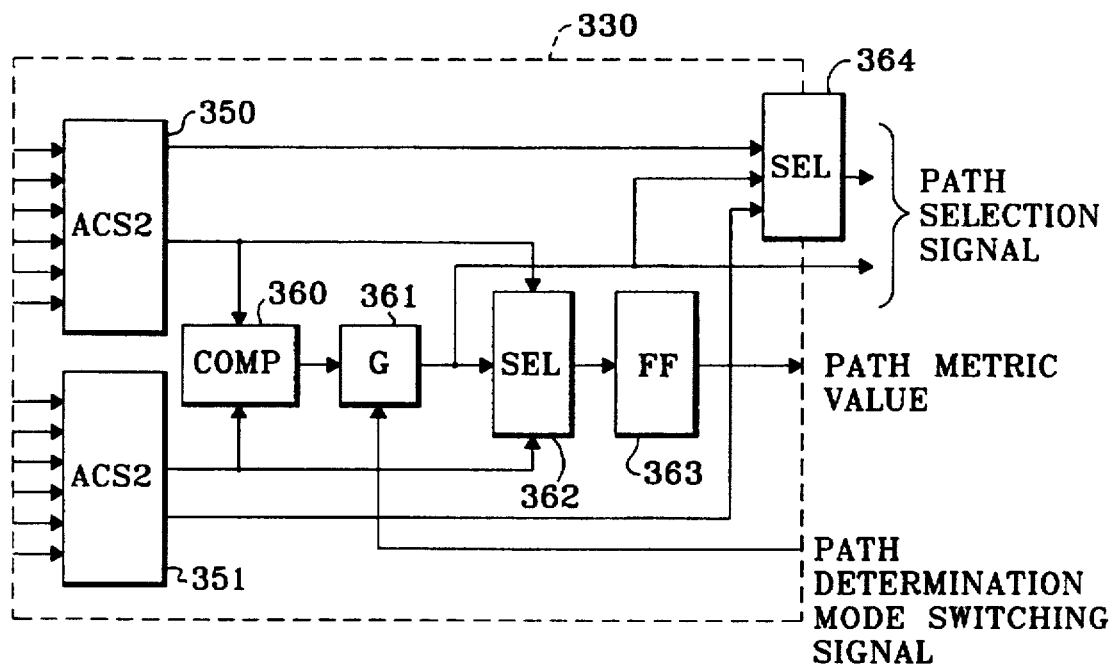
FIGS. 14A and 14B are circuit diagrams of the ACS circuit in the construction of FIG. 11.
Figure 14B:
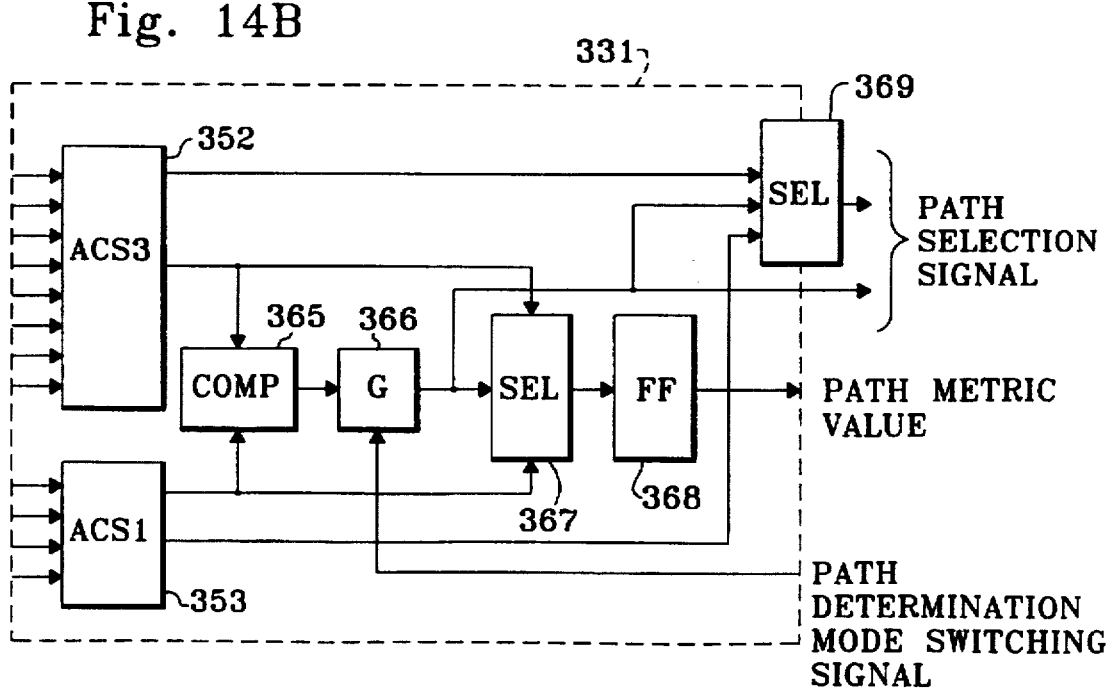
Figure 15A:
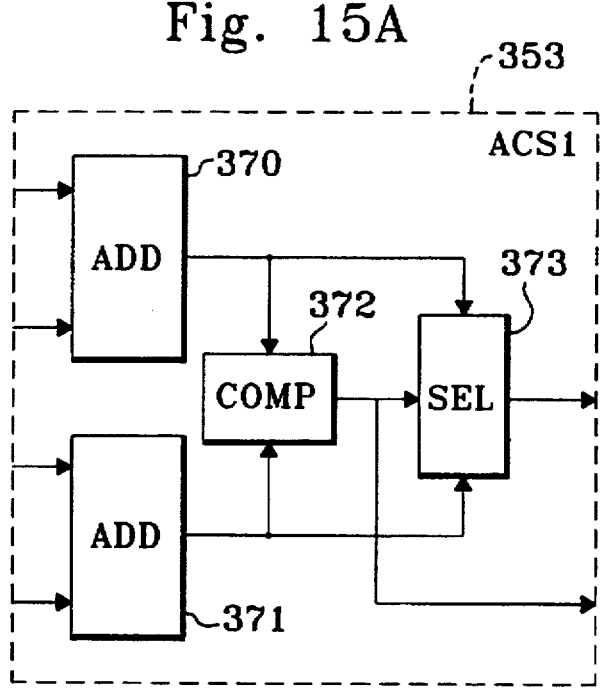
FIG. 15A is a circuit diagram of the ACS circuit in the construction of FIG. 14B.
Figure 15B:
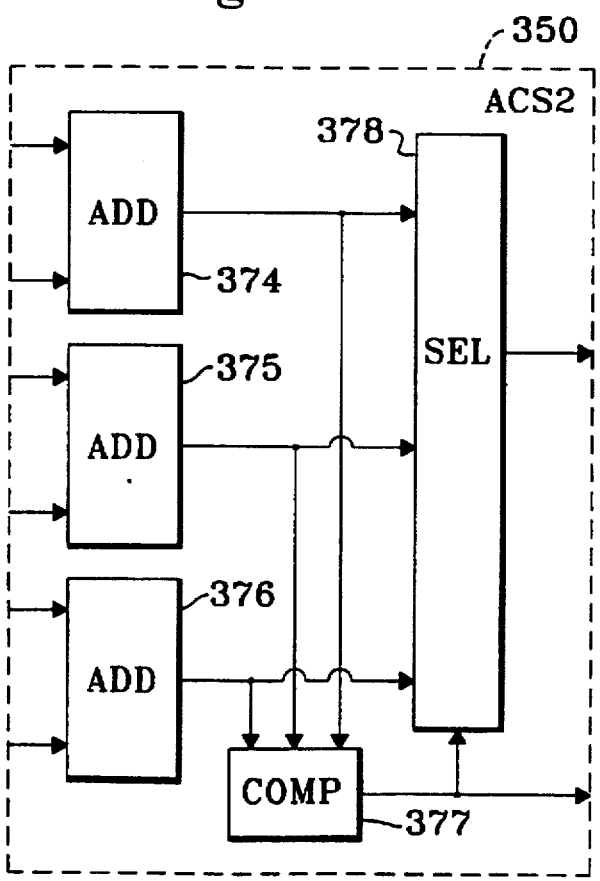
FIG. 15B is a circuit diagram of the ACS circuit in the construction of FIG. 14A.
Figure 16:
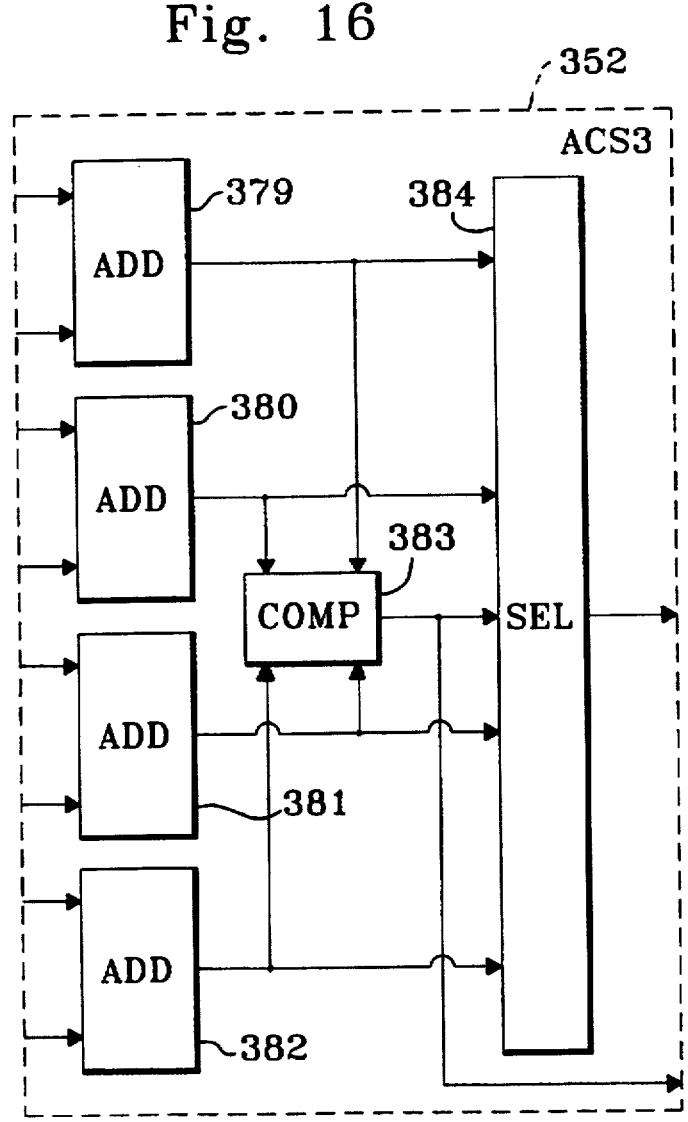
FIG. 16 is a circuit diagram of the ACS circuit in the construction of FIG. 14B.

FIG. 10 is a trellis diagram, showing a time-division process, of assistance in explaining a modified embodiment of the maximum likelihood detector according to the present invention. FIG. 11 is a block diagram showing the modified embodiment of the maximum likelihood detector of the present invention. FIGS. 12 and 13 are block diagrams each illustrating the details thereof. FIGS. 14A and 14B are circuit diagrams each illustrating an ACS circuit thereof. FIGS. 15A and 15B are circuit diagrams each illustrating the ACS circuits shown in FIGS. 14A and 14B. FIG. 16 is a circuit diagram of the ACS circuit shown in FIG. 14B.

In the maximum likelihood detection in the $(1+D-D^2-D^3)$ shown in FIGS. 6 through 8, it can not be known that the 3-bitwise transition is a code delimiter or in the code, and hence the statuses are divided into the A and B groups. If it is possible to know whether it is the code delimiter or in the code, as illustrated in FIG. 10, the statuses can be reduced down to a half. That is, they can be reduced to [001], [010], [100], [011], [101], [110].

Accordingly, as shown in FIG. 10, the path selection process is time-divided depending on the code delimiter and the in-code state, thereby reducing the statuses down to the half.

As illustrated in FIG. 11, the maximum likelihood detector 3 is constructed of a distributor 35, six ACS circuits 330–335 and a path memory 34. Then, the six ACS circuits 330–335 execute a determination of the transitions from the status A groups to the status B groups and also a determination of the transitions from the status B groups to the status A groups on the basis of the time-division.

Then, the six ACS circuits 330–335 switch a path determination mode in accordance with a path determination mode switching signal. This path determination mode switching signal serves to indicate whether transition is in the code or the code delimiter 3-bitwise. This path determination mode signal is obtained by detecting a sync byte in the magnetic disk device.

As shown in FIG. 12, the ACS circuit 330 determines the [001] transitions from the status A groups to the [001] of the status B groups and also the transitions from the status B groups to the [001] of the status A groups. Candidates for these [001] transitions are, as shown above in FIG. 10, the transitions from [001], [101], [100], [011], [101], [110] of the status A groups as well as being the transitions from [011], [101], [110] of the status B groups.

Therefore, as illustrated in FIG. 14A, the ACS circuit 330 includes two 6-input ACS circuits 350, 351, a comparator 360 for comparing path metric values selected by the two ACS circuits 350, 351 and a gate 361 controlled by the path determination mode switching signal.

Further, the ACS circuit 330 includes a selector 362 for selecting the path metric values selected by the two ACS circuits 350, 351 on the basis of a signal transmitted from the gate 361, a register 363 for holding it and a selector 364 for selecting a compared result between the two ACS circuits 350, 351 in accordance with the signal from the gate 361.

Each of those ACS circuits 350, 351 includes, as illustrated in FIG. 15B, three sets of 2-input adders 374, 375, 376, a comparator 377 for comparing outputs of those adders 374, 375, 376 and a selector 378 for selecting outputs of the three adders 374, 375, 376 in accordance with a compared result of the comparator 377.

Hence, in the ACS circuit 330, the adder 374 of the first ACS circuit 350 adds a branch metric value $(Y_{n-2}-1)^2+(Y_{n-1}+1)^2+Y_n^2$ from [001] and a path metric value (herein indicated by 001) from [001] of the previous stage, thus calculating a path metric candidate value of [001].

Similarly, the adder 375 of the first ACS circuit 350 adds a branch metric value $(Y_{n-2}+1)^2+(Y_{n-1}+1)^2+(Y_n-1)^2$ from [101] and a path metric value (herein indicated by 010) from [010] of the previous stage, thus calculating the path metric candidate value of [010].

Similarly, the adder 376 of the first ACS circuit 350 adds a branch metric value $(Y_{n-2}+1)^2+Y_{n-1}^2+(Y_n-1)^2$ from [100] and a path metric value (herein indicated by 100) from [100] of the previous stage, thus calculating the path metric candidate value of [100].

Then, the comparator 377 of the first ACS circuit 350 compares those path metric candidate values. Moreover, the selector 378 of the first ACS circuit 350 selects those path metric candidate values on the basis of the compared result of the comparator 377.

Also, the adder 374 of the second ACS circuit 351 adds a branch metric value $Y_{n-2}^2+(Y_{n-1}+2)^2+Y_n^2$ from [011] and a path metric value (herein indicated by 001) from [001] of the previous stage, thus calculating a path metric candidate value of [001].

Similarly, the adder 375 of the second ACS circuit 351 adds a branch metric value $Y_{n-2}^2+(Y_{n-1}+1)^2+Y_n^2$ from [101] and a path metric value (herein indicated by 101) from

[101] of the previous stage, thus calculating the path metric candidate value of [001].

Similarly, the adder 376 of the second ACS circuit 351 adds a branch metric value $(Y_{n-2}+2)^2+(Y_{n-}+1)^2+(Y_n-1)^2$ from [110] and a path metric value (herein indicated by 110) from [110] of the previous stage, thus calculating the path metric candidate value of [001].

Then, the comparator 377 of the second ACS circuit 351 compares those path metric candidate values. Moreover, the selector 378 of the second ACS circuit 351 selects those path metric candidate values on the basis of the compared result of the comparator 377.

Then, the comparator 360 of the ACS circuit 330 compares the selected path metric candidate values of the first and second ACS circuits 350, 351 and thus selects a path of the minimum candidate value.

The gate 361 outputs the selected result of the comparator 360 when the path determination mode switching signal indicates the code delimiter. On the other hand, the gate 361 gives forth a selection output for selecting the ACS 351 when the path determination mode switching signal indicates the in-code state.

Accordingly, in the code delimiter, the selector 362 selects the output of the first ACS circuit 350 or the second ACS circuit 351 on the basis of the compared result of the comparator 360. This selected result is a path metric value selected. Further, the selector 364 selects the compared result of the first ACS circuit 350 or the compared result of the second ACS circuit 351 in accordance with the compared result. An output of this selector 354 and an output of the gate 361 turn out to be path selection signals.

Also, in the in-code state, the selector 362 selects the output of the second ACS circuit 351. The selector 364 selects the compared result of the second ACS circuit 351 in accordance with the output of the gate 361. An output of this selector 364 and an output of the gate 361 turn out to be path selection signals.

Thus, the transition from the status A to the status B (code delimiter) and the transition from the status B to the statu A (in-code state) are determined by the time division processing which controls the gate.

Hereinbelow, similarly, the ACS circuit 331 determines the transitions from the [010] of the status A groups to the status B groups and the transitions from the status B groups to the [010] of the status A groups.

The ACS circuit 332 determines the transitions from the status A groups to the [100] of the status B groups and the transitions from the status B groups to the [100] of the status A groups.

The ACS circuit 333 determines the transitions from the status A groups to the [011] of the status B groups and the transitions from the status B groups to the [011] of the status A groups.

The ACS circuit 334 determines the transitions from the status A groups to the [101] of the status B groups and the transitions from the status B groups to the [101] of the status A groups.

The ACS circuit 335 determines the transitions from the status A groups to the [110] of the status B groups and the transitions from the status B groups to the [110] of the status A groups.

Among them, the configurations of the ACS circuits 332, 333, 335 are the same as that of the ACS circuit 330. On the other hand, the configurations of the ACS circuits 331, 334 are shown in FIG. 14B.

That is, each of the ACS circuits 331, 334 includes an 8-input ACS circuit 352, a 4-input ACS circuit 353, a comparator 365 for comparing the path metric values selected by the two ACS circuits 352, 353 and a gate 366 controlled by the path determination mode switching signal.

Furthermore, each of the ACS circuits 331, 334 includes a selector 367 for selecting the path metric values selected by the two ACS circuits 352, 353 on the basis of a signal from the gate 366, a register 368 for holding it and a selector 369 for selecting the compared results of the two ACS circuits 352, 353 in accordance with a signal of the gate 366.

The 8-input ACS circuit 352 includes, as illustrated in FIG. 16, four sets of 2-input adders 379, 380, 381, 382, a comparator 383 for comparing outputs of those adders 379, 380, 381, 382 and a selector 384 for selecting outputs of the four adders 379, 380, 381, 382 in accordance with a compared result of the comparator 383.

Further, the 4-input ACS circuit 353 includes, as shown in FIG. 15A, two sets of 2-input adders 370, 371, a comparator 372 for comparing outputs of those adders 370, 371 and a selector 373 for selecting outputs of the two adders 370, 371 in accordance with a compared result of the comparator 372.

An explanation of the operations thereof will be omitted because of only a difference in the number of input from the ACS circuit 330.

As described above, the determinations of the transitions from the status A groups to the status B groups and of the transitions from the status B groups to the status A groups are executed based on the time-division by use of the path determination mode switching signal and the gate as well. Consequently, the number of statuses can be halved, the circuit scale can be thereby downsized.

Figure 17:
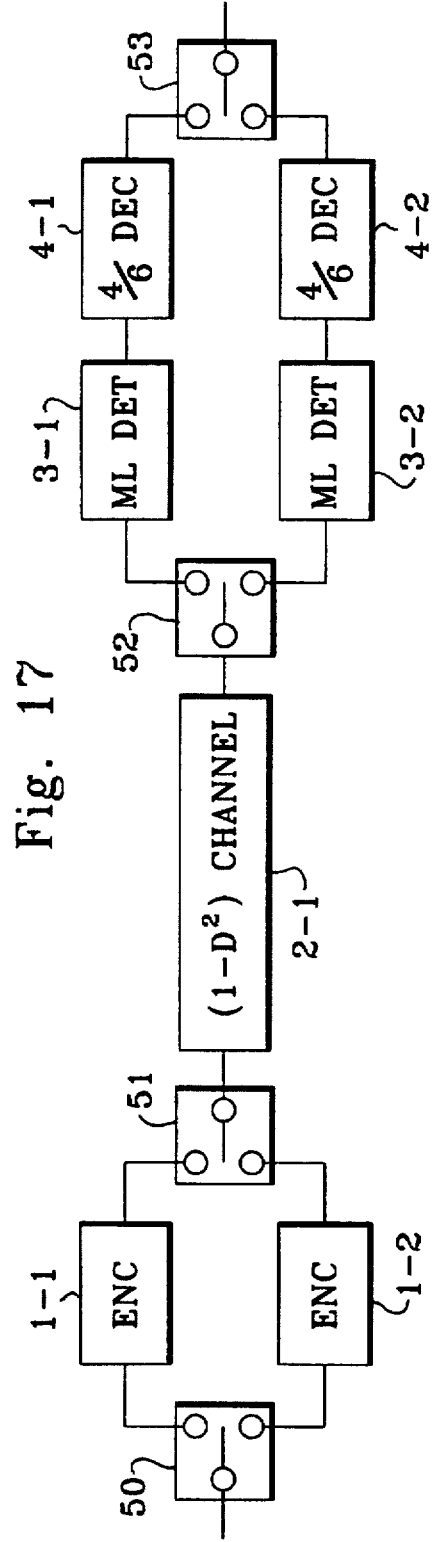
FIG. 17 is a block diagram in a $(1-D^2)$ channel showing a modified embodiment of the present invention.

FIG. 17 shows a block diagram of a $(1-D^2)$ channel by way of a modified embodiment of the present invention.

As known well, the $(1-D^2)$ channel is a $(1-D)$ independent channel due to interleaving.

As illustrated in FIG. 17, a first divider circuit 50 divides the data string into an odd-numbered string and an even-numbered string. A first 4/6 encoder 1-1 converts the data of the odd-numbered string 4-bitwise into 6-bit code words. A second 4/6 encoder 1-2 converts the data of the even-numbered string 4-bitwise into 6-bit code words.

A first multiplexer circuit 51 switches the code words of the two 4/6 encoders 1-1, 1-2 and outputs them to a $(1-D^2)$ channel 2-1. Regenerative signals from the $(1-D^2)$ channel 2-1 are divided by a second divider circuit 52 into the odd-numbered string and the even-numbered string.

A first maximum likelihood detector 3-1 maximum-likelihood-detects the regenerative signal of the odd-numbered string. A second maximum likelihood detector 3-2 maximum-likelihood-detects the regenerative signal of the even-numbered string. A first 4/6 decoder 4-1 decodes the maximum-likelihood-detected regenerative signal of the odd-numbered string 6-bitwise the 4-bit data. A second 4/6 decoder 4-2 decodes the maximum-likelihood-detected regenerative signal of the even-numbered string 6-bitwise the 4-bit data.

A second multiplexer circuit 53 switches the data of the two 4/6 decoders 4-1, 4-2 and then outputs the data.

Thus, with the interleaving process, the equalization signals are divided into the odd- and even-numbered strings, and the $(1-D)$ independent channels are attained. Accordingly, the maximum likelihood detections can be performed by the respective $(1-D)$ maximum likelihood detectors.

Figure 18:
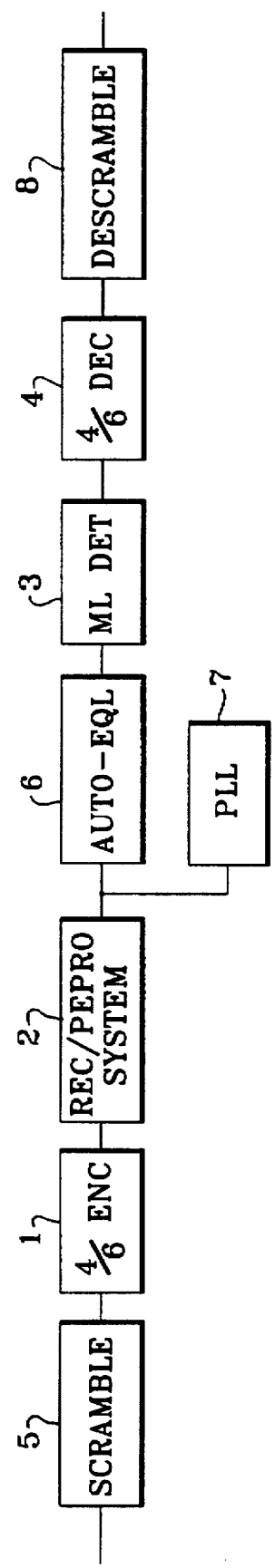
FIG. 18 is a block diagram illustrating a modified embodiment of the PRML system of the present invention.

FIG. 18 is a diagram illustrating a configuration of a modified embodiment of the present invention. Referring to FIG. 18, the same components as those shown in FIG. 2 are marked with the like symbols.

A scrambler circuit 5 scrambles the data before being encoded. The scrambled data are converted by the 4/6 encoder 1 into the 6-bit code words. The 6-bit code words are recorded on a recording/reproducing system 2.

The signals regenerated by the recording/reproducing system 2 are auto-equalized by an auto-equalizer 6. The auto-equalized signals are maximum-likelihood-detected by the maximum likelihood detector 3. The 6-bit data of the maximum-likelihood-detected signals are converted by the 4/6 decoder 4 into the 4-bit data. These pieces of 4-bit data are descrambled by a descrambler circuit 8.

A PLL circuit 7 extracts clocks from the regenerative signals transmitted from the recording/reproducing system 2.

Thus, the data are scrambled before being encoded and, after being decoded, descrambled. Clocking is thereby stabilized, and a deviation in the equalization is prevented.

Figure 19:
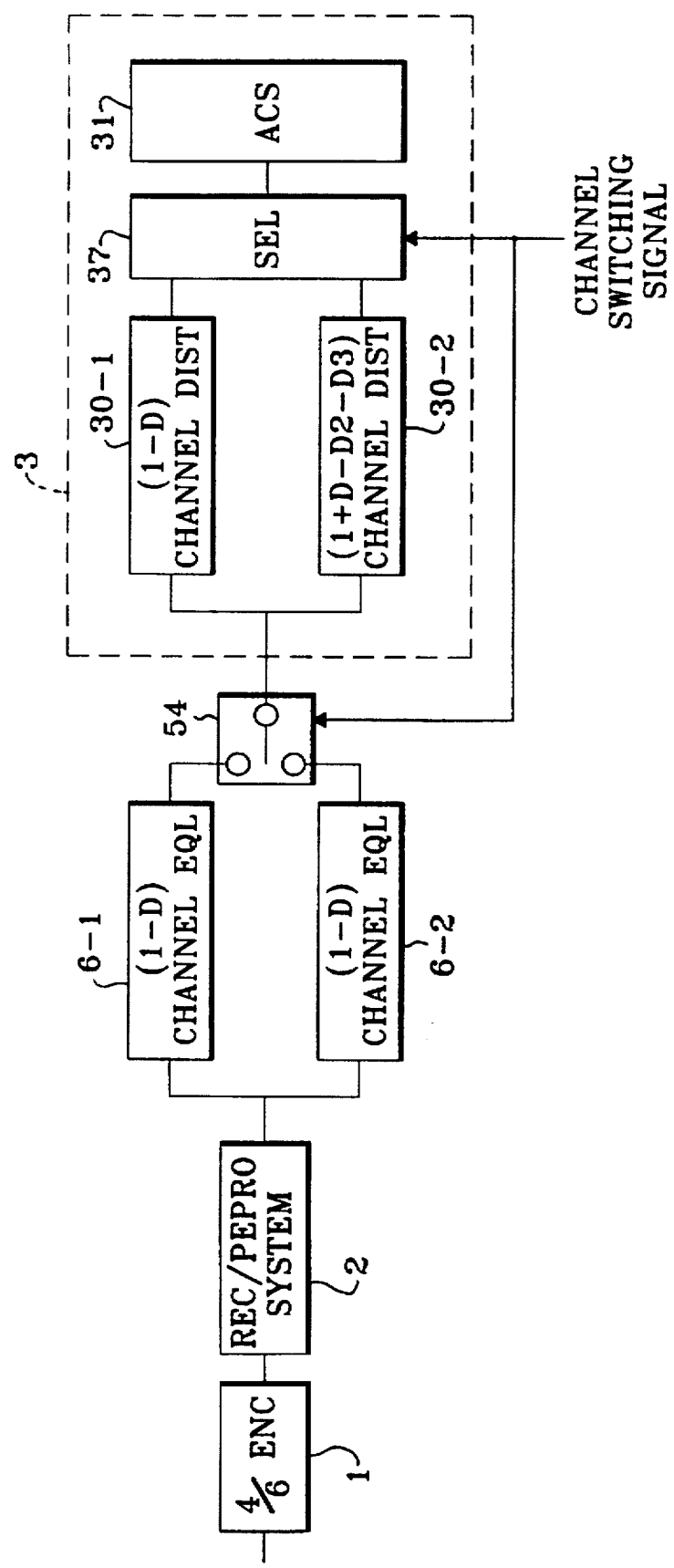
FIG. 19 is a block diagram illustrating another modified embodiment of the PRML system of the present invention.

FIG. 19 is a diagram illustrating a configuration of other modified embodiment of the present invention. Referring to FIG. 19, the same components as those shown in FIG. 2 are marked with the like symbols.

In this embodiment, a plurality of channels are provided, and a recording/reproducing channel is switched corresponding to a recording/regenerating characteristic. For instance, in the magnetic disk, an inner-side recording/ reproducing characteristic declines as compared with an outer-side recording/reproducing characteristic. Then, the $(1+D-D^2-D^3)$ channel is employed on the inner side. While on the outer side, the $(1-D)$ channel is used.

The 4-bit data among pieces of data are converted by the 4/6 encoder 1 into the 6-bit code words. The thus converted data are written to the recording/reproducing system 2. The signals regenerated from the recording/reproducing system 2 are equalized by a $(1-D)$ channel equalization circuit 6-1. Further, the regenerative signals are equalized by a $(1+D-D^2-D^3)$ channel equalization circuit 6-2.

A multiplexer circuit 54 switches an output of the $(1-D)$ channel equalization circuit 6-1 and an output of $(1+D-D^2-D^3)$ channel equalization circuit 6-2 in response to a channel switching signal.

Signals from the multiplexer circuit 54 are inputted to a $(1-D)$ channel distributor 30-1 and a $(1+D-D^2-D^3)$ channel distributor 30-2. The distributor 30-1 calculates a branch metric value of the $(1-D)$ channel. The distributor 30-2 calculates a branch metric value of the $(1+D-D^2-D^3)$ channel.

A selector 37 switches outputs of the distributors 30-1, 30-2 in accordance with the channel switching signal. An ACS circuit 31, when a selection output from the selector 37 is inputted thereto, calculates, compares and selects the above path metric candidate values.

Thus, the recording/reproducing characteristic is switched over for every recording/reproducing channel. The maximum likelihood detection can be thereby effected with an optimum characteristic. Further, there are provided the plurality of distributors and the selector for selecting the outputs of those distributors, thereby making it possible to easily actualize the system.

The present invention is, though discussed by exemplifying the magnetic recording/reproducing system, applicable also to a communications system.

The present invention may be, though discussed above by way of the embodiments, modified in a variety of forms within the scope of the gist of the present invention, and those modifications are not excluded from the range of the present invention.

As explained above, according to the present invention, first, the 4-bit data are converted into the 6-bit code words, and hence the encoding gain can be obtained in the PRML system. Second, the encoding gain can be readily obtained by the code conversion.

What is claimed is:

1. An encoding method for a PRML system for maximum-likelihood-detecting and demodulating an encoded partial response signal in which 4-bit data are encoded into 6-bit code words Y={001011, 001101, 001 110, 010011, 010110, 011001, 011010, 011100, 100011, 100101, 100110, 101001, 101100, 110001, 110010, 110100}, said method comprising:

a step of segmenting an input data string into 4-bit data; and a step of converting the 4-bit data into 6-bit code words Y, excluding 6-bit words {000000, 000001, 000010, 000011, 000100, 000101, 000110, 000111, 111000, 111001, 111010, 111011, 111100, 111101, 111110, 111111} in which no clock signal is received for a long period in an EPR4 channel, excluding 6-bit words {001001, 001010, 001100, 010100, 100100, 011011, 011101, 011110, 101101, 101110, 110110) having small gain, and excluding 6-bit words {010101, 101010} in which the signal is 0 in the EPR4 channel.

2. An encoding apparatus for a PRML system for maximum-likelihood-detecting and demodulating a encoded partial response signal in which 4-bit data are encoded into 6-bit code words Y={001011, 001101, 001110, 010011, 010110, 011001, 011010, 011100, 100011, 100101, 100110, 101001, 101100, 110001, 110010, 110100}, said apparatus comprising:

means for segmenting an input data string into 4-bit data; and means for converting the 4-bit data into 6-bit code words Y, excluding those 6-bit words {000000, 000001, 000010, 000011, 000100, 000101, 000110, 000111, 111000, 111001, 111010, 111011, 111100, 111101, 111110, 111111} in which no clock signal is received for a long period in an EPR4 channel, excluding those 6-bit words {001001, 001010, 001100, 010100, 100100, 011011, 011101, 011110, 101101, 101110, 110110) having a small gain, and excluding those 6-bit words {010101, 101010} in which the signal is 0 in the EPR4 channel.

3. A demodulating method of demodulating signals in which 4-bit data are encoded into 6-bit cord words Y={001011, 001101, 001110, 010011, 010110, 011001, 011010, 011100, 100011, 100101, 100110, 101001, 101100, 110001, 110010, 110100}, said method comprising:

a step of performing a maximum likelihood detection by use of a trellis transition, said trellis transition includes path transitions between status A groups {001A, 010A, 100A, 011A, 101A, 110A} constituting last-half 3 bits of the 6-bit code word and status B groups {001B, 010B, 100B, 011B, 101B, 110B} constituting first-half 3 bits of the 6-bit code word and path transitions from the status B groups to the status A groups including path transitions from 011B, 101B, 110B to 001A, 010A, 100A excluding path transition from 101B to 010A and the path transitions from 001B, 010B, 100B to 011A, 101A, 110A excluding the path transition from 010B to 101A; and a step of decoding the maximum-likelihood-detected 6-bit data into 4-bit data.

4. The decoding method according to claim 3, wherein said maximum likelihood detecting step is a step of time-division-processing the path transitions from the status A groups to the status B groups and the path transitions from the status B groups to the status A groups.

5. A demodulating apparatus for demodulating signals in which 4-bit data are encoded into 6-bit cord words Y={001011, 001101, 001110, 010011, 010110, 011001, 011010, 011100, 100011, 100101, 100110, 101001, 101100, 110001, 110010, 110100}, said apparatus comprising:

a maximum likelihood detector for performing a maximum likelihood detection by use of a trellis transition, said trellis transition includes path transitions between status A groups {001A, 010A, 100A, 011A, 101A, 110A} constituting last-half 3 bits of the 6-bit code word and status B groups {001B, 010B, 100B, 011B, 101B, 110B} constituting first-half 3 bits of the 6-bit code word and path transitions from the status B groups to the status A groups including path transitions from 011B, 101B, 110B to 001A, 010A, 100A excluding the path transition from 101B to 010A and path transitions from 001B, 010B, 100B to 011A, 101A, 110A excluding the path transition from 010B to 101A; and a decoder for decoding the maximum-likelihood-detected 6-bit data into 4-bit data.

6. The demodulating apparatus according to claim 5, wherein said maximum likelihood detector includes a circuit for time-division-processing the path transitions from the status A groups to the status B groups and the path transitions from the status B groups to the status A groups.

7. The demodulating apparatus according to claim 5, wherein said maximum likelihood detector includes:

a distributor for calculating a Euclid distance from a regenerative signal and outputting a branch metric value of each branch;

twelve sets of ACS circuits each for obtaining a path metric value of a next stage by adding the branch metric value to a path metric value of a previous stage, thereafter comparing the respective path metric values and outputting a path metric value of a maximum likelihood path; and a path memory for holding a history of the maximum likelihood path, wherein said 12 ACS circuits corresponding to the status A groups and the status B groups are constructed so that branches extend from all the status A groups to all the status B groups, there are made the path transitions from 011B, 101B, 110B to 001A, 010A, 100A exclusive of the path transition from 101B to 010A in the path transitions from the status B groups to the status A groups, and the branch extend to make the path transitions from 001B, 010B, 100B to 011A, 101A, 110A exclusive of the path transition from 010B to 101A.

8. A PRML system comprising:

an encoder for encoding 4-bit data into 6-bit cord words Y={001011, 001101, 001110, 010011, 010110, 011001, 011010, 011100, 100011, 100101, 100110, 101001, 101100, 110001, 110010, 110100}, a channel through which the encoded signals pass;

a maximum likelihood detector for performing such a maximum likelihood detection by use of a trellis transition, said trellis transition includes path transitions between status A groups {001A, 010A, 100A, 011A, 101A, 110A} constituting last-half 3 bits of the 6-bit code word from said channel and status B groups {001B, 010B, 100B, 011B, 101B, 110B} constituting first-half 3 bits of the 6-bit code word and path transitions from the status B groups to the status A groups including path transitions from 001B, 101B, 110B to 001A, 010A, 100A excluding the path transition from 101B to 010A and path transitions from 001B, 010B, 100B to 011A, 101A, 110A excluding the path transition from 010B to 101A; and a decoder for decoding the maximum-likelihood-detected 6-bit data into 4-bit data.

9. The PRML system according to claim 8, wherein said channel is an extend partial response class 4 channel.

10. The PRML system according to claim 8, wherein said channel is a magnetic recording/reproducing channel.

11. The PRML system according to claim 8, wherein said encoder has a couple of encoders, said maximum likelihood detector has a couple of maximum likelihood detectors, said decoder has a couple of decoders, and said system further comprising:

a first divider circuit for dividing the input data into an odd-numbered string and an even-numbered string and inputting them to said couple of encoders, respectively;

a first multiplexer for converting outputs of said couple of encoders into a single string;

a second divider circuit for dividing the data from said channel into the odd-numbered string and the even-numbered string and inputting them to said couple of maximum likelihood detectors, respectively; and a second multiplexer for converting outputs of said couple of decoders into a singe string.

12. The PRML system according to claim 8, further comprising:

a scramble circuit for scrambling the data inputted to said encoder; and a descramble circuit for descrambling the data from said decoder.

13. The PRML system according to claim 8, wherein said maximum likelihood detector includes a circuit for time-division-processing the path transitions from the status A groups to the status B groups and from the status B groups to the status A groups.

14. The PRML system according to claim 8, wherein said maximum likelihood detector incudes:

a distributor for calculating a Euclid distance from a regenerative signal and outputting a branch metric value of each branch;

twelve sets of ACS circuits each for obtaining a path metric value of a next stage by adding the branch metric value to a path metric value of a previous stage, thereafter comparing the respective path metric values and outputting a path metric value of a maximum likelihood path; and a path memory for holding a history of the maximum likelihood path, wherein said 12 ACS circuits corresponding to the status A groups and the status B groups are constructed so that branches extend from all the status A groups to all the status B groups, there are made the path transitions from 011B, 101B, 110B to 001A, 010A, 100A exclusive of the path transition from 101B to 010A in the path transitions from the status B groups to the status A groups, and the branch extend to make the path transitions from 001B, 010B, 100B to 011A, 101A, 110A exclusive of the path transition from 010B to 101A.

* * * * *

UNITED STATES PATENT AND TRADEMARK OFFICE
CERTIFICATE OF CORRECTION

PATENT NO. : 5,777,566
DATED : July 7, 1998
INVENTOR(S) : Kaneyasu Shimoda

It is certified that error appears in the above-identified patent and that said Letters Patent is hereby corrected as shown below:

Column 2, line 28, delete "cord" and insert --code-- therefor

Column 2, line 46, delete "cord" and insert --code-- therefor

Column 2, line 67, delete "cord" and insert --code-- therefor

Column 5, line 9, delete "cord" and insert --code-- therefor

Column 5, line 34, delete "word words" and insert --code words-- therefor

UNITED STATES PATENT AND TRADEMARK OFFICE
CERTIFICATE OF CORRECTION

PATENT NO. : 5,777,566
DATED : July 7, 1998
INVENTOR(S) : Kaneyasu Shimoda

It is certified that error appears in the above-identified patent and that said Letters Patent is hereby corrected as shown below:

Column 6, line 48, delete "$1+D-D^2+D^3$" and insert --$1+D-D^2-D^3$-- therefor

Column 9, line 62, delete "[001]." and insert --[001],-- therefor

Column 11, line 4, delete "$(Y_{n-}+1)^2$" and insert --$(Y_{n-1}+1)^2$-- therefor Column 11, line 39, delete "statu" and insert --status-- therefor Column 14, line 21, delete ")" and insert --}-- therefor

UNITED STATES PATENT AND TRADEMARK OFFICE
CERTIFICATE OF CORRECTION

PATENT NO. : 5,777,566
DATED : July 7, 1998
INVENTOR(S) : Kaneyasu Shimoda

It is certified that error appears in the above-identified patent and that said Letters Patent is hereby corrected as shown below:

Column 14, line 41, delete ")" and insert --}-- therefor

Column 14, line 46, delete "cord" and insert --code-- therefor

Column 15, line 4, delete "cord" and insert --code-- therefor

Column 15, line 53, delete "cord" and insert --code-- therefor

Signed and Sealed this

Twenty-sixth Day of January, 1999

Attest:

Attesting Officer

*Acting Commissioner of Patents and Trademarks*